United States Patent
Ojima et al.

(10) Patent No.: US 11,727,554 B2
(45) Date of Patent: Aug. 15, 2023

(54) INSPECTION SYSTEM, INSPECTION METHOD, PROGRAM, AND STORAGE MEDIUM

(71) Applicant: Panasonic Intellectual Property Management Co., Ltd., Osaka (JP)

(72) Inventors: Takanobu Ojima, Osaka (JP); Jeffry Fernando, Osaka (JP); Hideto Motomura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/827,183

(22) Filed: May 27, 2022

(65) Prior Publication Data
US 2022/0358638 A1 Nov. 10, 2022

Related U.S. Application Data

(63) Continuation of application No. 16/770,537, filed as application No. PCT/JP2018/045094 on Dec. 7, 2018, now Pat. No. 11,379,968.
(Continued)

(51) Int. Cl.
*G06T 7/00* (2017.01)
*G06T 7/50* (2017.01)
(Continued)

(52) U.S. Cl.
CPC .......... *G06T 7/0004* (2013.01); *G01N 21/251* (2013.01); *G01N 21/8806* (2013.01);
(Continued)

(58) Field of Classification Search
CPC .......... G06T 7/0004; G06T 7/40; G06T 7/50; G06T 7/90; G06T 2207/10024;
(Continued)

(56) References Cited

U.S. PATENT DOCUMENTS

| | | |
|---|---|---|
| 2010/0049484 A1 | 2/2010 | Berlin et al. |
| 2010/0091272 A1 | 4/2010 | Asada et al. |

(Continued)

FOREIGN PATENT DOCUMENTS

| | | |
|---|---|---|
| JP | H04-035773 A | 2/1992 |
| JP | H05-081697 U | 11/1993 |

(Continued)

OTHER PUBLICATIONS

International Search Report and Written Opinion issued in International Patent Application No. PCT/JP2018/045094, dated Feb. 26, 2019; with partial English translation.
(Continued)

*Primary Examiner* — Ping Y Hsieh
*Assistant Examiner* — Daniella M. DiGuglielmo
(74) *Attorney, Agent, or Firm* — McDermott Will & Emery LLP

(57) ABSTRACT

An inspection system includes an acquisition unit and a determination unit. The acquisition unit acquires an image representing a surface of an object. The determination unit performs color determination processing. The color determination processing is performed to determine a color of the surface of the object based on a plurality of conditions of reflection. The plurality of conditions of reflection are obtained from the image representing the surface of the object as acquired by the acquisition unit, and have a specular reflection component and a diffuse reflection component at respectively different ratios on the surface of the object.

8 Claims, 17 Drawing Sheets

Related U.S. Application Data

(60) Provisional application No. 62/699,935, filed on Jul. 18, 2018, provisional application No. 62/699,942, filed on Jul. 18, 2018, provisional application No. 62/596,247, filed on Dec. 8, 2017.

(51) Int. Cl.

| | | |
|---|---|---|
| *G06T 7/90* | (2017.01) | |
| *G06T 7/40* | (2017.01) | |
| *G01N 21/88* | (2006.01) | |
| *G01N 21/25* | (2006.01) | |
| *H04N 23/56* | (2023.01) | |
| *H04N 23/60* | (2023.01) | |
| *H04N 23/90* | (2023.01) | |
| *G01N 21/94* | (2006.01) | |
| *G01N 21/84* | (2006.01) | |
| *G01N 21/55* | (2014.01) | |

(52) U.S. Cl.
CPC ............... *G06T 7/40* (2013.01); *G06T 7/50* (2017.01); *G06T 7/90* (2017.01); *H04N 23/56* (2023.01); *H04N 23/60* (2023.01); *H04N 23/90* (2023.01); *G01N 21/55* (2013.01); *G01N 21/8422* (2013.01); *G01N 21/94* (2013.01); *G01N 2021/555* (2013.01); *G01N 2021/8416* (2013.01); *G01N 2021/8427* (2013.01); *G01N 2021/8845* (2013.01); *G06T 2207/10024* (2013.01); *G06T 2207/30156* (2013.01); *G06T 2207/30248* (2013.01)

(58) Field of Classification Search
CPC .......... G06T 2207/30156; G06T 2207/30248; G01N 21/251; G01N 21/8806; G01N 21/55; G01N 21/8422; G01N 21/94; G01N 2021/555; G01N 2021/8416; G01N 2021/8427; G01N 2021/8845; H04N 5/2256; H04N 5/232; H04N 5/247; H04N 23/56; H04N 23/60; H04N 23/90
See application file for complete search history.

(56) References Cited

U.S. PATENT DOCUMENTS

| | | |
|---|---|---|
| 2013/0057678 A1 | 3/2013 | Prior Carrillo et al. |
| 2015/0002653 A1 | 1/2015 | Hwang et al. |
| 2016/0140734 A1 | 5/2016 | Kato |

FOREIGN PATENT DOCUMENTS

| | | | |
|---|---|---|---|
| JP | 2000-193601 A | | 7/2000 |
| JP | 2000193601 A | * | 7/2000 |
| JP | 3211681 B2 | | 7/2001 |
| JP | 2005-181038 A | | 7/2005 |
| JP | 2005181038 A | * | 7/2005 |
| JP | 2005-291843 A | | 10/2005 |
| JP | 2010-122155 A | | 6/2010 |
| JP | 2011-505567 A | | 2/2011 |
| JP | 2012-083239 A | | 4/2012 |
| JP | 2014-240766 A | | 12/2014 |
| JP | 2015-155892 A | | 8/2015 |
| JP | 2015-184184 A | | 10/2015 |
| JP | 6038965 B2 | | 12/2016 |
| KR | 10-1782542 B1 | | 9/2017 |
| WO | 2011/144964 A1 | | 11/2011 |

OTHER PUBLICATIONS

Non-Final Office Action dated Nov. 1, 2021 issued in U.S. Appl. No. 16/770,537.

Notice of Allowance dated Mar. 1, 2022 issued in U.S. Appl. No. 16/770,537.

* cited by examiner

INSPECTION SYSTEM, INSPECTION METHOD, PROGRAM, AND STORAGE MEDIUM

CROSS-REFERENCE OF RELATED APPLICATIONS

This application is a Continuation of U.S. patent application Ser. No. 16/770,537, filed on Jun. 5, 2020, which is the U.S. National Phase under 35 U.S.C. § 371 of International Patent Application No. PCT/JP2018/045094, filed on Dec. 7, 2018, which is based on and claims priority of U.S. Provisional Patent Application No. 62/699,935, filed on Jul. 18, 2018, U.S. Provisional Patent Application No. 62/699,942, filed on Jul. 18, 2018, and U.S. Provisional Patent Application No. 62/596,247, filed on Dec. 8, 2017, the entire disclosures of which applications are incorporated by reference herein.

TECHNICAL FIELD

The present disclosure generally relates to an inspection system, an inspection method, a program, and a storage medium, and more particularly relates to an inspection system, inspection method, program, and storage medium, all of which are configured or designed to make a decision about the surface of an object using an image.

BACKGROUND ART

Patent Literature 1 discloses a coloring inspection device. The coloring inspection device of Patent Literature 1 includes: a camera having three spectral sensitivities that have been linearly transformed into values equivalent to a CIEXYZ color matching function; an arithmetic-logic unit (processor) for calculating and acquiring coloring data by transforming an image having the three spectral sensitivities and captured by the camera into tristimulus values X, Y, and Z in the CIEXYZ color system; and a lighting unit for irradiating an automobile, which is an exemplary object of measurement, with light. The coloring inspection device carries out color inspection by calculating an index of color distribution matching indicating the ratio of overlap between two xyz chromaticity histograms of an object under test and a reference object.

CITATION LIST

Patent Literature

Patent Literature 1: JP 2015-155892 A

SUMMARY OF INVENTION

It is an object of the present disclosure to provide an inspection system, an inspection method, a program, and a storage medium, all of which are configured or designed to improve the accuracy of surface color determination of a given object.

An inspection system according to an aspect of the present disclosure includes an acquisition unit and a determination unit. The acquisition unit acquires an image representing a surface of an object. The determination unit performs color determination processing. The color determination processing is performed to determine a color of the surface of the object based on a plurality of conditions of reflection. The plurality of conditions of reflection are obtained from the image representing the surface of the object as acquired by the acquisition unit, and have a specular reflection component and a diffuse reflection component at respectively different ratios on the surface of the object.

An inspection method according to another aspect of the present disclosure includes an acquisition step and a determination step. The acquisition step includes acquiring an image representing a surface of an object. The determination step includes performing color determination processing. The color determination processing is performed to determine a color of the surface of the object based on a plurality of conditions of reflection. The plurality of conditions of reflection are obtained from the image representing the surface of the object, and have a specular reflection component and a diffuse reflection component at respectively different ratios on the surface of the object.

A program according to still another aspect of the present disclosure is designed to cause one or more processors to execute the inspection method described above.

A storage medium according to yet another aspect of the present disclosure is a computer-readable non-transitory storage medium storing the program described above thereon.

DESCRIPTION OF EMBODIMENTS

1. Embodiments

1.1 Overview

Figure 1:
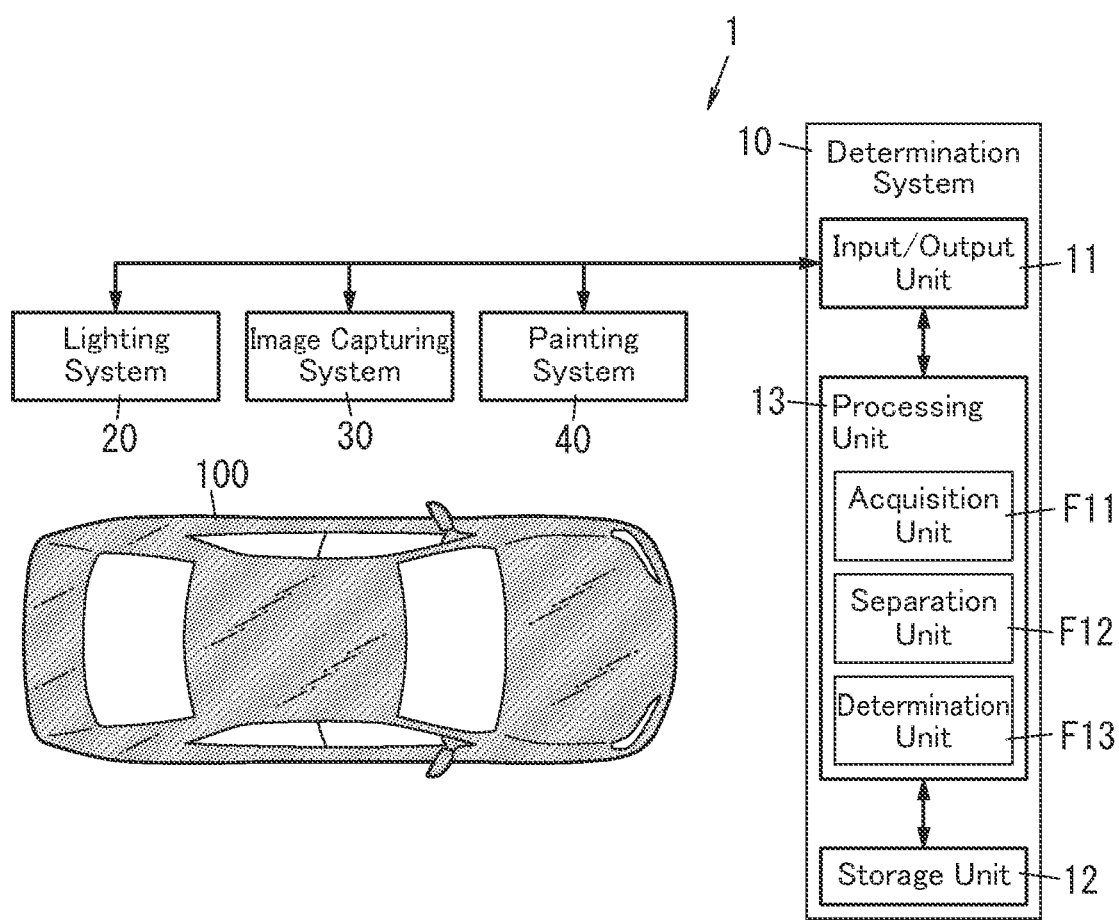
FIG. 1 is a block diagram illustrating an inspection system according to an exemplary embodiment.

FIG. 1 illustrates an inspection system 1 according to an exemplary embodiment. The inspection system 1 includes an acquisition unit F11 and a determination unit F13. The acquisition unit F11 acquires an image representing a surface of an object 100. The determination unit F13 performs color determination processing. The color determination processing is performed to determine a color of the surface of the object 100 based on a plurality of conditions of reflection. The plurality of conditions of reflection are obtained from the image representing the surface of the object 100 as acquired by the acquisition unit F11, and have a specular reflection component and a diffuse reflection component at respectively different ratios on the surface of the object 100.

The inspection system 1 determines the color of the surface of the object 100 from multiple viewpoints, not a single viewpoint. More particularly, the inspection system 1 determines the color of the surface of the object 100 based on a plurality of conditions of reflection having a specular reflection component and a diffuse reflection component at respectively different ratios on the surface of the object 100. Specifically, the specular reflection component represents the surface condition of the object 100 more faithfully than the diffuse reflection component does. On the other hand, the diffuse reflection component represents the color of the surface itself of the object 100 more accurately than the specular reflection component does. This allows the color of the surface of the object 100 to be determined with not only the color of the surface itself of the object 100 but also the surface condition of the object 100 taken into account. Consequently, this inspection system 1 improves the accuracy of surface color determination of the object 100.

1.2 Details

Next, the inspection system 1 will be described in further detail with reference to the accompanying drawings. This inspection system 1 is a system for subjecting an object 100 to some type of inspection. For example, the inspection system 1 may serve as a coloring inspection device. In this embodiment, the inspection is supposed to be performed by the inspection system 1 with respect to the color, painting condition, and texture of the surface of the object 100. In addition, the inspection system 1 may also paint the object 100. The inspection system 1 may paint the object 100 based on a result of the inspection, thereby turning the object 100 into an object 100 painted in any desired color(s).

The object 100 may be any type of object having a surface. Specifically, in this embodiment, the object 100 is an automobile. Specifically, the surface of the object 100 is an outer surface of the vehicle body of the automobile. However, this is only an example and should not be construed as limiting. That is to say, the object 100 does not have to be an automobile but may also be any other type of moving vehicle or may even be an object other than moving vehicles. Examples of the moving vehicles include bicycles, motorcycles, railway trains, drones, aircrafts, construction machines, ships, and boats. The object 100 may even be an electric device, a piece of tableware, a container, a piece of furniture, clothes, or a building material. In short, the object 100 may be any type of object having a surface. In particular, the inspection system 1 according to this embodiment is effectively applicable to any object to be painted.

As shown in FIG. 1, the inspection system 1 includes a determination system 10, a lighting system 20, an image capturing system 30, and a painting system 40.

Figure 2:
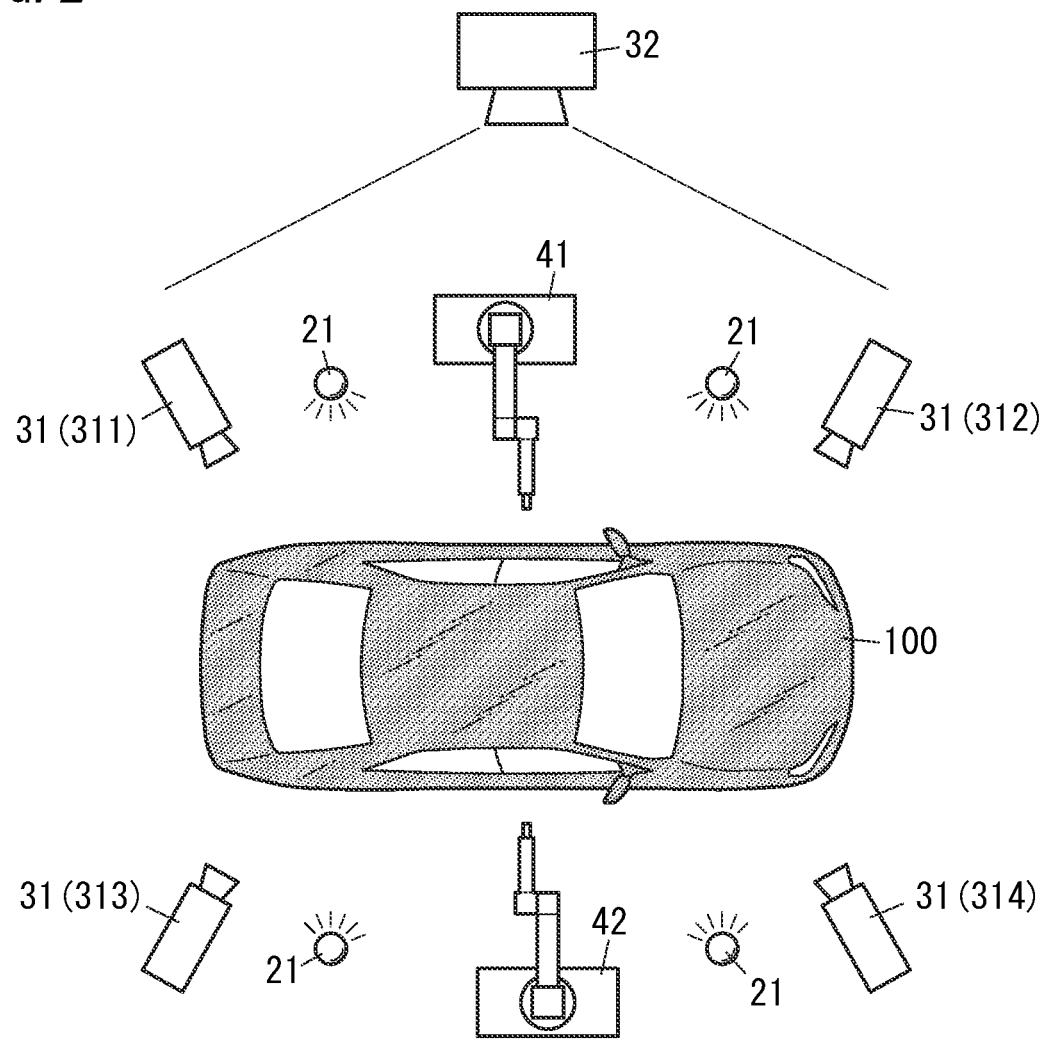
FIG. 2 illustrates how the inspection system works.

The lighting system 20 is a system for irradiating the surface of the object 100 with light. As shown in FIG. 2, the lighting system 20 includes a plurality of (e.g., four in the example shown in FIG. 2) lamps 21 for irradiating the object 100 with light. The lamps 21 may be LED lamps, for example. Each of these lamps 21 radiates white light. Note that this lighting system 20 may include any other number of lamps 21, which do not have to be LED lamps but may also be any other type of light sources. The light emitted from the lamps 21 does not have to be white light, either. The color of the light emitted from the lamps 21 may be determined appropriately with the color of the object 100 and the colors detectable for the image capturing system 30 taken into account. Optionally, the wavelength of the light radiated by the lighting system 20 may be changeable. In this embodiment, the inspection system 1 includes the lighting system 20. However, if the color of the object 100 is determinable even without the lighting system 20, the lighting system 20 may be omitted.

The image capturing system 30 is a system for generating an image (digital image) representing the surface of the object 100. In this embodiment, the image capturing system 30 generates an image representing the surface of the object 100 by capturing an image of the surface of the object 100 being irradiated by the lighting system 20. The image capturing system 30 includes a plurality of cameras, each of which includes one or more image sensors. Optionally, each camera may include one or more line sensors.

In this embodiment, the plurality of cameras of the image capturing system 30 includes four (first) cameras 31 (311-314) and one (second) camera 32 as shown in FIG. 2. In this case, the first cameras 31 and the second camera 32 may be displaced with respect to the object 100. Also, the second camera 32 suitably has a wider angle of view than the first cameras 31 and is suitably able to generate an image representing the object 100 in its entirety. For example, the second camera 32 may be located to overlook the object 100 to generate an image representing a bird's-eye view of the object 100.

The painting system 40 is a system for painting the surface of the object 100. As shown in FIG. 2, the painting system 40 includes a plurality of painting units (e.g., two painting units 41, 42). In this embodiment, the painting units 41, 42 are both implemented as painting robots. The painting units 41, 42 are displaceable with respect to the object 100. The painting robots may have a known configuration, and detailed description thereof will be omitted herein. Note that the painting system 40 needs to include at least one painting unit, and therefore, the number of the painting units provided does not have to be two.

The determination system 10 includes an input/output unit 11, a storage unit 12, and a processing unit 13 as shown in FIG. 1. The determination system 10 may be implemented as a computer system. The computer system may include one or more processors, one or more connectors, one or more communications devices, and one or more memories, for example.

The input/output unit 11 is an interface through which information is input and output from one of the lighting system 20, the image capturing system 30, or the painting system 40 to another. In this embodiment, the input/output unit 11 is connected to be communicable with the lighting system 20, the image capturing system 30, and the painting system 40. The input/output unit 11 includes one or more input/output devices, and uses one or more input/output interfaces.

The storage unit 12 is used to store information to be used by the processing unit 13. The storage unit 12 includes one or more storage devices, which may be a random access memory (RAM) and/or an electrically erasable programmable read-only memory (EEPROM). The storage unit 12 stores sample data to be used in the color determination processing. The sample data includes information about a target color of the surface of the object 100 (i.e., color data as samples). The information about the target color of the surface of the object 100 may be provided as reflectance values on a wavelength basis (see FIG. 11). For example, the information about the target color of the surface of the object 100 may be provided as reflectance values falling within the wavelength range from 380 nm to 780 nm. That is to say, the sample data has an aspect as digital color samples. In addition, the sample data may also include at least one of information about the shape of the object 100 (information about the shape of the object of shooting) or information about a condition for capturing an image of the object 100. The condition for capturing an image of the object 100 may include a relative positional relation between the object 100, the lighting system 20, and the image capturing system 30 (i.e., information about the relative positions of the object of shooting, the lighting, and the cameras). In other words, the condition for capturing an image of the object 100 may include information about the lighting provided by the lighting system 20 (hereinafter referred to as "lighting information"). For example, the sample data may be an image representing a whole of the surface of the object 100 that has been captured under a predetermined image capturing condition. Besides, the storage unit 12 may further store standard information for use in the painting determination processing. The standard information represents a target surface painting condition of the object 100. In other words, the standard information indicates in what condition the object 100 should be painted.

The processing unit 13 may be implemented as one or more processors (or microprocessors). That is to say, the one or more processors perform the function of the processing unit 13 by executing one or more programs (computer programs) stored in one or more memories. The one or more programs may be stored in advance in the one or more memories. Alternatively, the one or more programs may also be downloaded via a telecommunications line such as the Internet or distributed after having been stored in a non-transitory storage medium such as a memory card.

Figure 12:
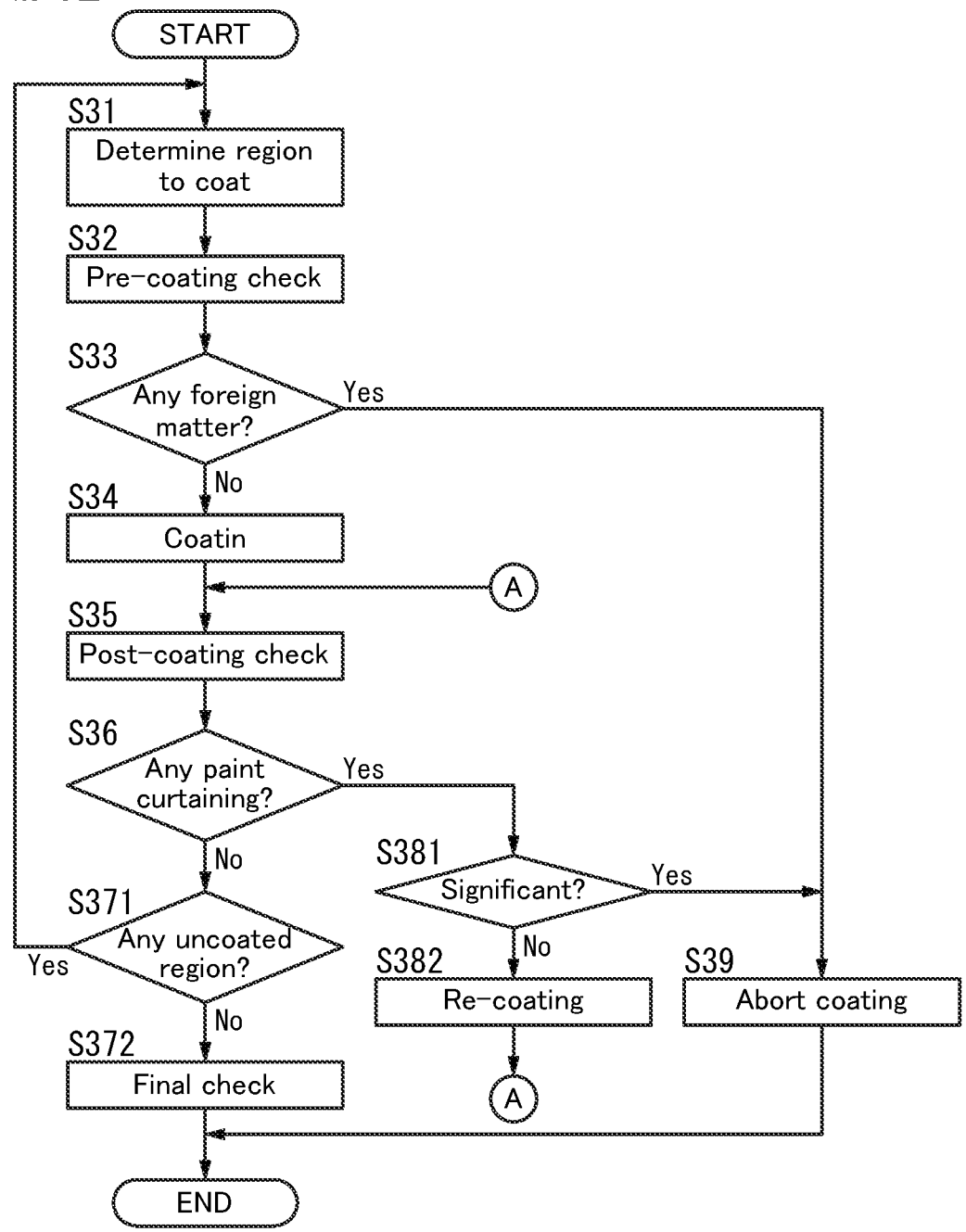
FIG. 12 is a flowchart showing the procedure of painting processing including painting determination processing to be performed by the inspection system.
Figure 15:
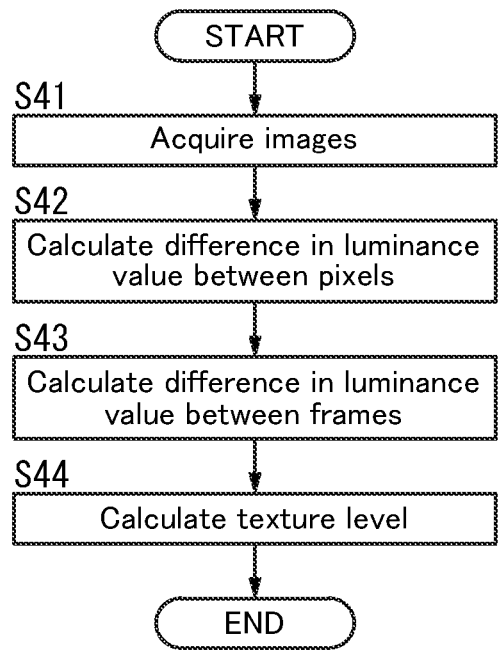
FIG. 15 is a flowchart showing the procedure of texture determination processing to be performed by the inspection system.

The processing unit 13 performs setting processing (see FIG. 3), color determination processing (see FIG. 4), painting determination processing (see FIG. 12), and texture determination processing (see FIG. 15). The processing unit 13 includes the acquisition unit F11, a separation unit F12, and the determination unit F13 as shown in FIG. 1. Note that the acquisition unit F11, separation unit F12, and determination unit F13 do not have a substantive hardware configuration but are actually respective functions to be performed by the processing unit 13.

Figure 9:
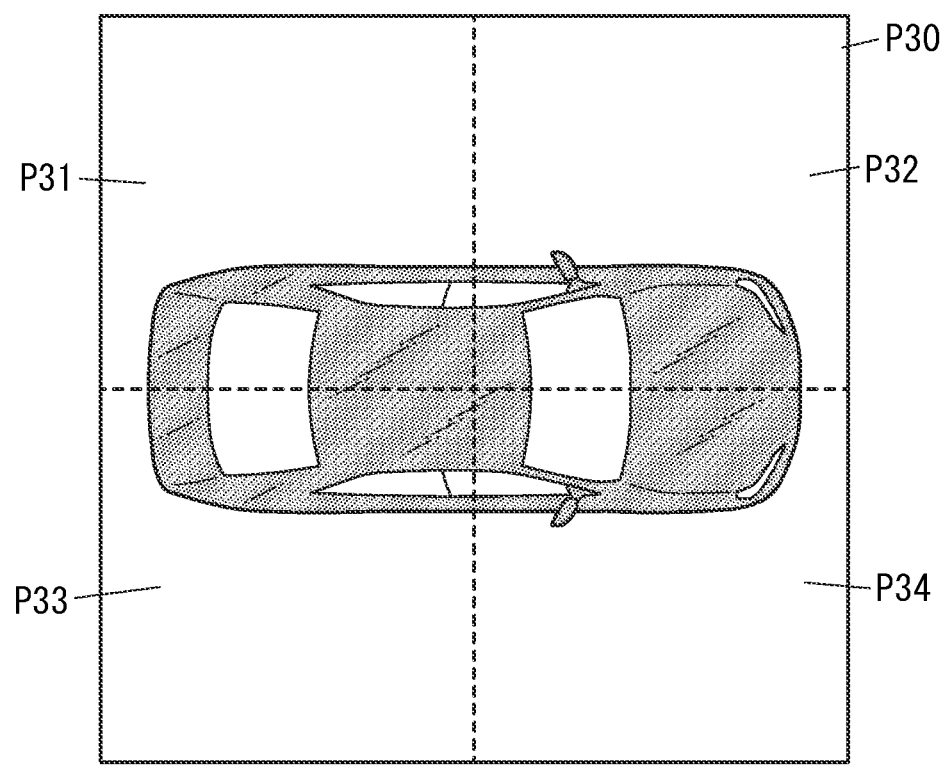
FIG. 9 illustrates how the inspection system performs synthesis processing in one way.
Figure 10:
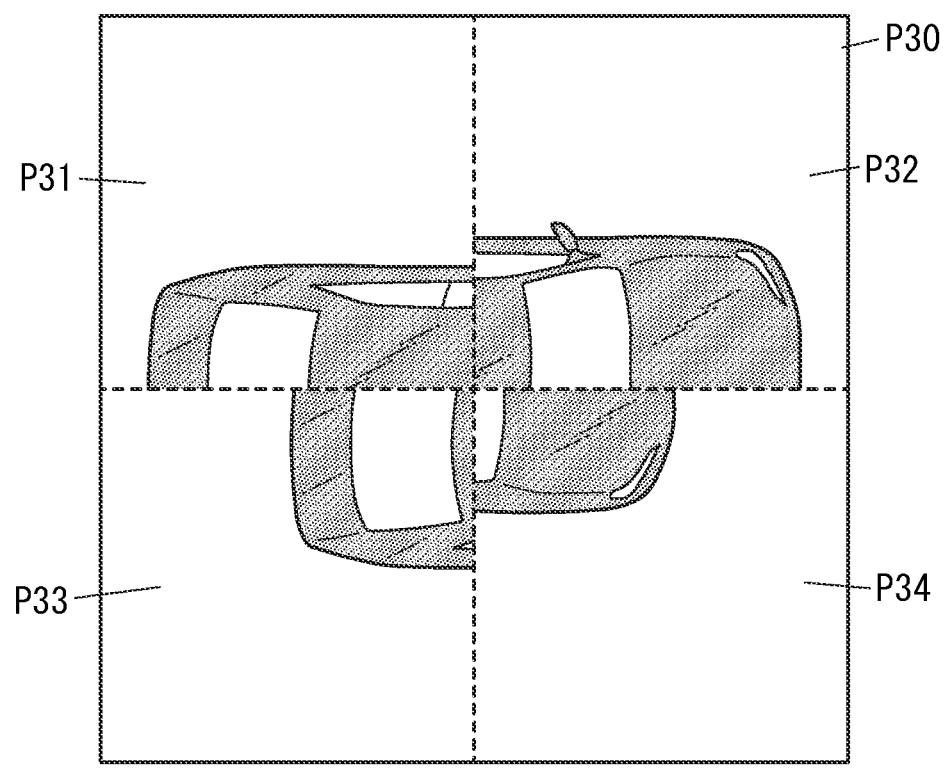
FIG. 10 illustrates how the inspection system performs synthesis processing in another way.

The acquisition unit F11 acquires an image representing the surface of the object 100 (see FIGS. 9 and 10). In this embodiment, the acquisition unit F11 acquires an image representing the surface of the object 100 from the image capturing system 30. That is to say, the acquisition unit F11 receives the image from the image capturing system 30 via the input/output unit 11. It depends on the image capturing condition for the image capturing system 30 what image the acquisition unit F11 acquires from the image capturing system 30.

Figure 5:
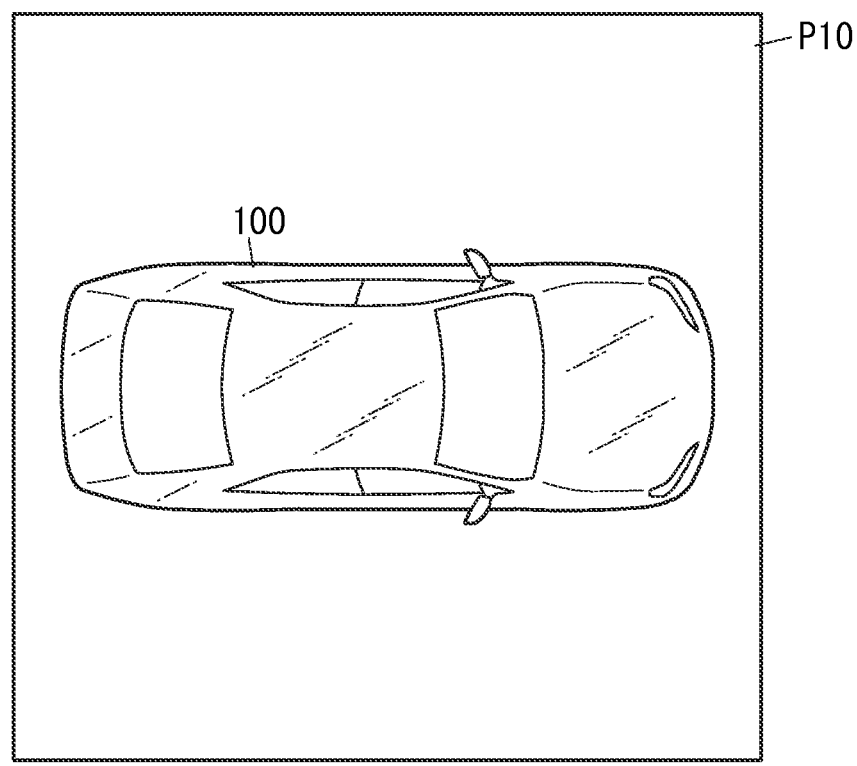
FIG. 5 illustrates a first separate image.
Figure 6:
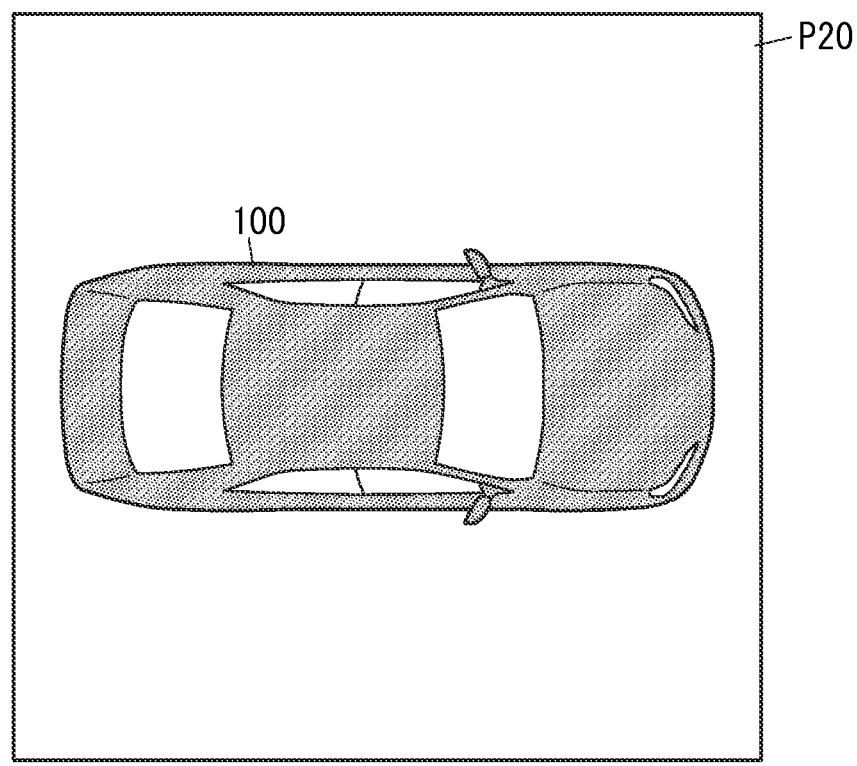
FIG. 6 illustrates a second separate image.

The separation unit F12 performs separation processing. The separation processing is processing for obtaining, from the image representing the surface of the object 100 as acquired by the acquisition unit F11, a plurality of conditions of reflection having a specular reflection component and a diffuse reflection component at respectively different ratios on the surface of the object 100. When performing the separation processing, the separation unit F12 obtains, as images representing the plurality of conditions of reflection having a specular reflection component and a diffuse reflection component at respectively different ratios on the surface of the object 100, a plurality of separate images from the image acquired by the acquisition unit F11. The plurality of separate images represents respective surface images of the object 100 and are images having a specular reflection component and a diffuse reflection component at respectively different ratios on the surface of the object. In this embodiment, the plurality of separate images are a first separate image P10 (see FIG. 5) and a second separate image (see FIG. 6). However, the number of the separate images does not have to be two but may also be three or more.

Figure 7:
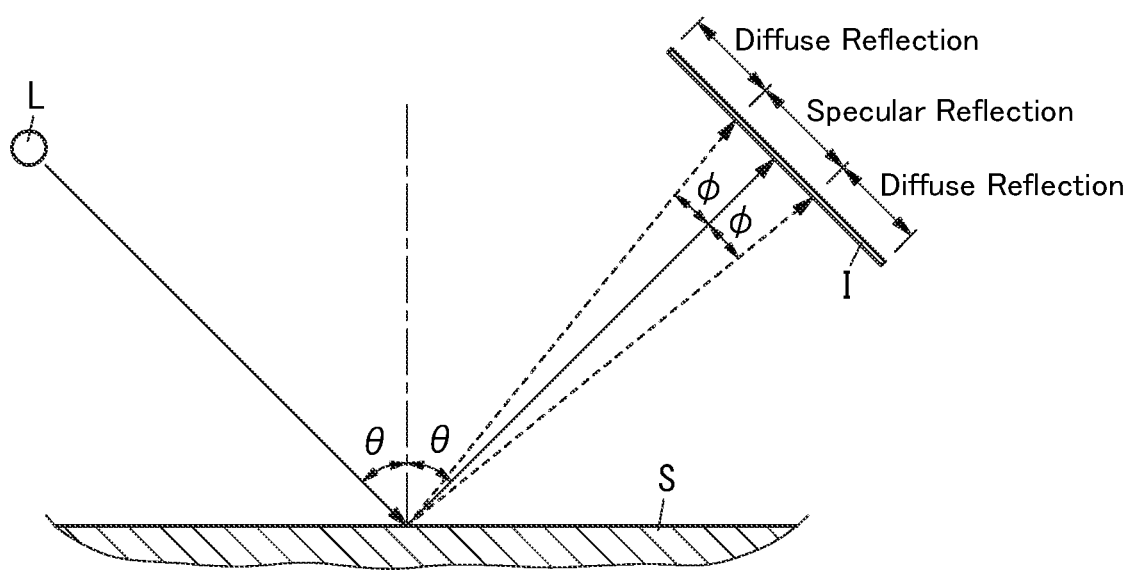
FIG. 7 illustrates how the inspection system performs a type of separation processing.
Figure 8:
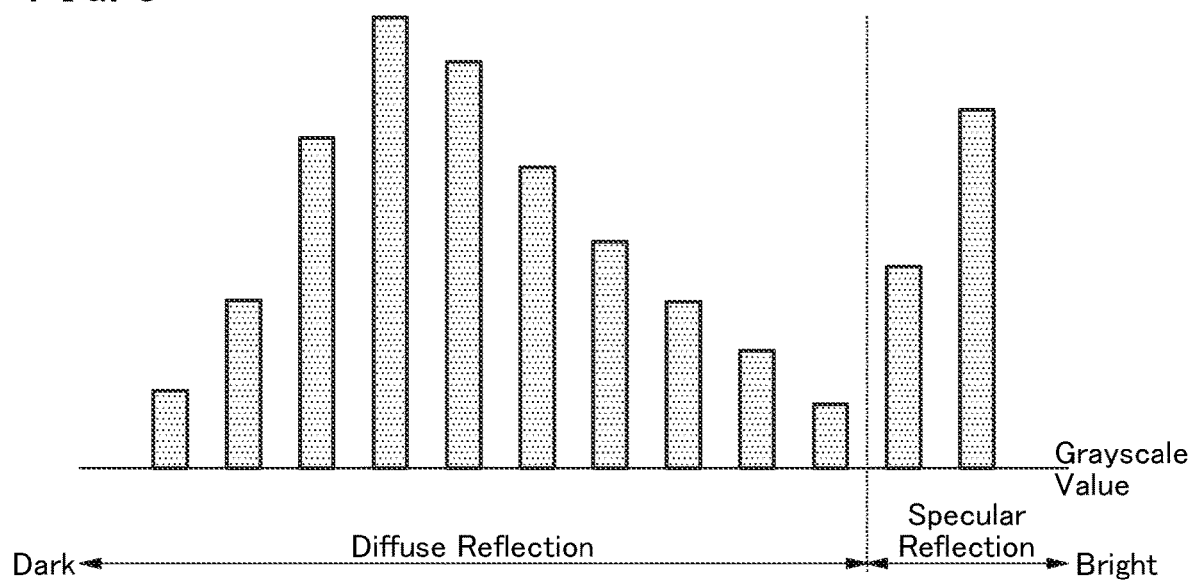
FIG. 8 illustrates how the inspection system performs another type of separation processing.

As used herein, the "plurality of conditions of reflection" includes the condition of reflection of light from the surface of the object 100. When the surface of the object 100 is viewed from a different direction, the ratio of the specular reflection component and the diffuse reflection component is variable. Therefore, it can be said that the plurality of conditions of reflection are the conditions of the surface of the object 100 as viewed from multiple different viewpoints. Images representing multiple different conditions of reflection from the surface of the object 100 may be obtained by capturing images of the surface of the same object 100 using a plurality of cameras set up at multiple different positions. When images of the surface of the object 100 are captured with a plurality of cameras set up at multiple different positions, each of the images thus captured may include both a specular reflection component and a diffuse reflection component. Nevertheless, either only the specular reflection component or only the diffuse reflection component may be extracted from the given image through arithmetic processing. As shown in FIG. 7, the specular reflection component has a peak around a region on an image capturing plane I where the angle of incidence of the light from a light source L onto a surface S is equal to the angle of reflection of the light from the surface S. Therefore, the specular reflection component is dominant in a region on the image capturing plane I corresponding to a predetermined range ($\theta \pm \varphi$) centered around the angle of reflection $\theta$. Meanwhile, the diffuse reflection component is dominant in the remaining region on the image capturing plane I excluding the region corresponding to the predetermined range ($\theta \pm \varphi$). Therefore, on the image capturing plane I, the intensity of the reflected light is given as a synthetic value of the specular reflection component and the diffuse reflection component. In addition, the specular reflection component and the diffuse reflection component may be estimated based on a statistical model. Furthermore, the specular reflection component and the diffuse reflection component have different intensity distributions, and therefore, are separable from each other based on the grayscale values (luminance values) of the image as shown in FIG. 8.

In this embodiment, the separation unit F12 extracts the first separate image P10 (see FIG. 5) and the second separate image (see FIG. 6) from the image acquired by the acquisition unit F11. Therefore, the plurality of conditions of reflection may include a condition with only the specular reflection component and a condition with only the diffuse reflection component. The first separate image P10 represents a condition in which the surface of the object 100 has only the specular reflection component. The second separate image P20 represents a condition in which the surface of the object 100 has only the diffuse reflection component. In this case, the specular reflection component represents the surface condition of the object 100 more faithfully than the diffuse reflection component does. On the other hand, the diffuse reflection component represents the color of the surface itself of the object 100 more accurately than the specular reflection component does.

The determination unit F13 performs the setting processing (see FIG. 3), the color determination processing (see FIG. 4), the painting processing (see FIG. 12), and the texture determination processing (see FIG. 15).

(Setting Processing)

The setting processing is pre-processing to be performed before the color determination processing. The setting processing includes entering settings into the image capturing system 30. To enter settings into the image capturing system 30, the determination unit F13 determines an image capturing condition for the image capturing system 30. The image capturing condition defines the operating conditions of a plurality of cameras (in particular, the plurality of first cameras 31) of the image capturing system 30. The operating conditions may include their positions with respect to the surface of the object 100, an image capturing direction with respect to the surface of the object 100, the angle of view (sight), and a zoom power (zooming). In this embodiment, the four first cameras 311-314 of the image capturing system 30 generate partial images P31-P34 representing respective parts of the surface of the object 100 as shown in FIGS. 9 and 10. In this embodiment, the plurality of partial images P31-P34 are generated by a plurality of cameras 31 having respectively different image capturing directions with respect to the object 100. Thus, to produce an image (overall image) P30 representing the whole of the surface of the object 100 based on these partial images P31-P34 generated by the four first cameras 311-314, the determination unit F13 determines the image capturing condition for the image capturing system 30 as shown in FIG. 9. The determination unit F13 enters settings into the image capturing system 30 in accordance with the image capturing condition thus determined. This allows the image capturing system 30 to obtain an overall image of the object 100. Note that in this embodiment, the whole of the surface of the object 100 only needs to be the entire region to be subjected to the color determination processing and does not have to be the whole surface of the object 100 in a practical sense.

Figure 3:
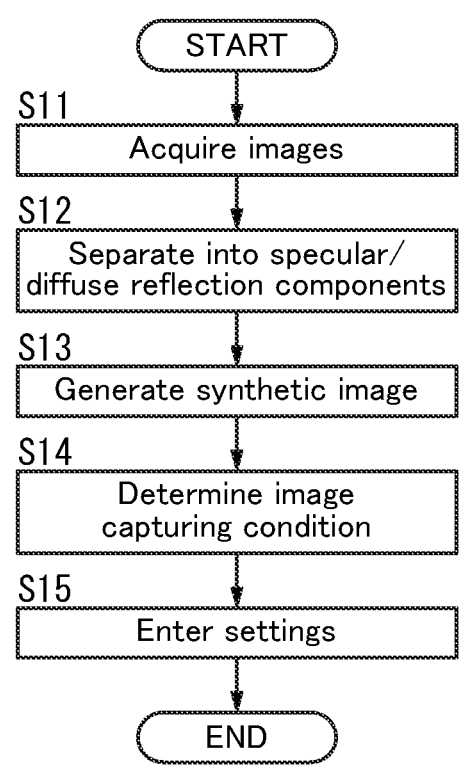
FIG. 3 is a flowchart showing the procedure of setting processing to be performed by the inspection system.

Next, the procedure of the setting processing will be described with reference to the flowchart shown in FIG. 3.

First of all, the determination unit F13 makes the acquisition unit F11 acquire the plurality of partial images P31-P34 of the object 100 from the image capturing system 30 (in S11). A first separate image and a second separate image are obtained (extracted) by the separation unit F12 from each of the plurality of partial images P31-P34 acquired by the acquisition unit F11 (in S12). The determination unit F13 synthesizes together the respective first separate images of the plurality of partial images P31-P34 to generate a first synthetic image. In addition, the determination unit F13 also synthesizes together the respective second separate images of the plurality of partial images P31-P34 to generate a second synthetic image (in S13). The determination unit F13 determines an image capturing condition of the image capturing system 30 (in terms of the operating conditions of the four first cameras 311-314) such that continuity of the object 100 is maintained with respect to each of the first synthetic image and the second synthetic image (in S14). As used herein, if the continuity of the object 100 (i.e., the continuity of gradation of the object of shooting) is maintained, then it means that the shape of the object 100 is expressed accurately in the synthetic image generated by synthesizing together the partial images. FIG. 9 illustrates a situation where the continuity of the object 100 is maintained. On the other hand, FIG. 10 illustrates a situation where the continuity of the object 100 is not maintained. Note that to make the description more easily understandable, FIGS. 9 and 10 illustrate an example in which a synthetic image has been generated based on the partial images P31-P34, instead of the respective first separate images or second separate images. The determination unit F13 may determine the image capturing condition by reference to the information about the shape of the object 100 included in the sample data stored in the storage unit 12. The determination unit F13 determines the image capturing condition such that the shape of the object 100 in the first separate image and the second separate image matches the shape of the object 100 as indicated by the information included in the sample data. In accordance with the image capturing condition thus determined, the determination unit F13 enters settings into the image capturing system 30 (in S15). In this manner, the operating condition of the four first cameras 311-314 is updated. This allows the image capturing system 30 to obtain the overall image of the object 100.

As can be seen, the inspection system 1 synthesizes together the images (partial images) captured by the plurality of cameras 31 to generate synthetic images (i.e., a first synthetic image and a second synthetic image), calculates an image capturing condition based on the synthetic images, and then outputs the image capturing condition. Then, the inspection system 1 controls the angles of view and zooming of the cameras 31 such that the continuity of gradation of the object of shooting (object 100) is maintained based on the synthetic image.

(Color Determination Processing)

The color determination processing is processing for determining the color of the surface of the object 100. More specifically, the color determination processing is processing for determining the color of the surface of the object 100 based on a plurality of conditions of reflection, having a specular reflection component and a diffuse reflection component at respectively different ratios on the surface of the object 100. The plurality of conditions of reflection are obtained from the image representing the surface of the object 100 as acquired by the acquisition unit F11. In particular, in this color determination processing, the determination unit F13 determines the color of the surface of the object 100 based on a plurality of separate images P10 and P20. In addition, in this color determination processing, the determination unit F13 determines the color of the surface of the object 100 based on the plurality of images P10 and P20 each generated from the plurality of partial images P31-P34 and each representing the whole of the surface of the object 100 in each of the plurality of conditions of reflection. Note that the color of the surface of the object 100 may be determined on a pixel-by-pixel basis on the images P10 and P20.

Figure 4:
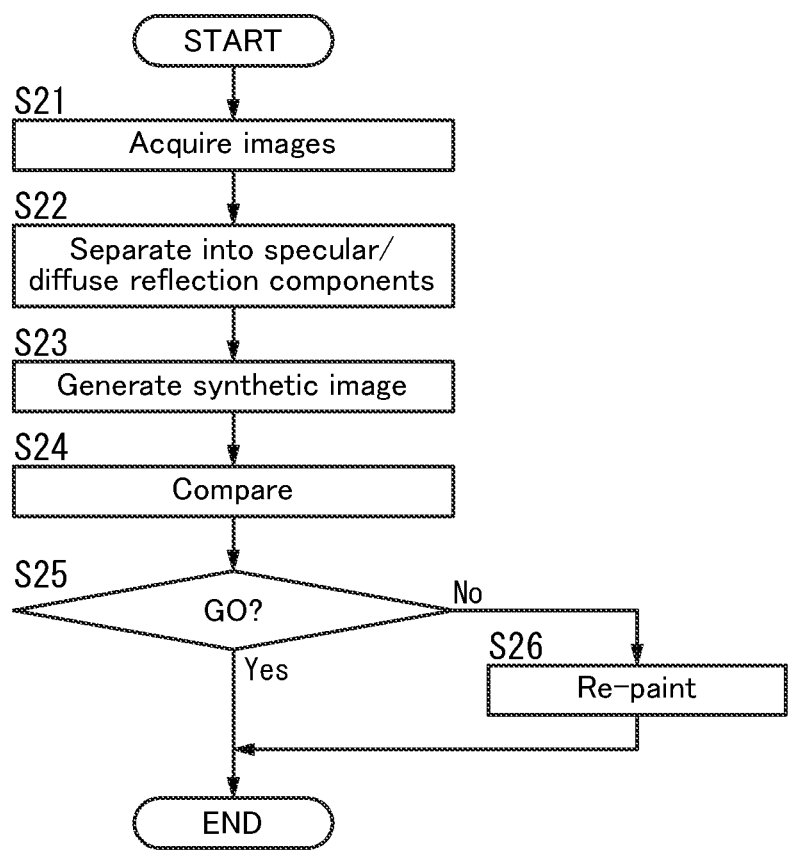
FIG. 4 is a flowchart showing the procedure of color determination processing to be performed by the inspection system.

Next, the procedure of the color determination processing will be described with reference to the flowchart of FIG. 4.

First of all, the determination unit F13 makes the acquisition unit F11 acquire the plurality of partial images P31-P34 of the object 100 from the image capturing system 30 (in S21). A first separate image and a second separate image are obtained (extracted) by the separation unit F12 from each of the plurality of partial images P31-P34 acquired by the acquisition unit F11 (in S22). The determination unit F13 synthesizes together the respective first separate images of the plurality of the partial images P31-P34 to generate a first synthetic image. In addition, the determination unit F13 also synthesizes together the respective second separate images of the plurality of the partial images P31-P34 to generate a second synthetic image (in S23). The determination unit F13 compares the color of the surface of the object 100 expressed in each of the first synthetic image and the second synthetic image with the information about the target color of the surface of the object 100 included in the sample data stored in the storage unit 12 (in S24). The information about the target color of the surface of the object 100 includes information about the target color of the surface for the first synthetic image and information about the target color of the surface for the second synthetic image. Thus, the determination unit F13 determines the color of the object 100 with respect to each of the first synthetic image and the second synthetic image. For example, when finding the degree of matching between the color actually obtained from the first synthetic image and the target color included in the sample data for the first synthetic image to be equal to or greater than a prescribed value, the determination unit F13 determines that the color obtained from the first synthetic image should be a GO. Likewise, when finding the degree of matching between the color actually obtained from the second synthetic image and the target color included in the sample data for the second synthetic image to be equal to or greater than a prescribed value, the determination unit F13 determines that the color obtained from the second synthetic image should be a GO. In this manner, the determination unit F13 determines the color of the surface of the object 100 based on an image representing the whole of the surface of the object 100 in each of a plurality of conditions of reflection and generated based on the plurality of partial images. When finding each of the colors obtained from the first synthetic image and the second synthetic image to be a GO, the determination unit F13 determines the result of the color determination processing to be a GO (if the answer is YES in S25).

Figure 11:
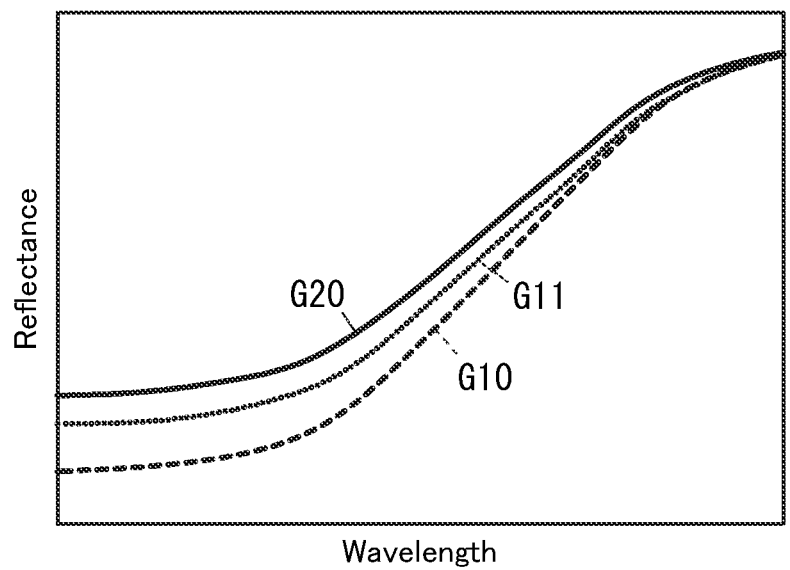
FIG. 11 illustrates how the inspection system performs color control processing.

On the other hand, when finding at least one of the colors obtained from the first synthetic image and the second synthetic image to be a NO-GO, the determination unit F13 determines the result of the color determination processing to be a NO-GO (if the answer is NO in S25). In that case, the determination unit F13 paints the object 100 all over again (in S26). In this re-painting processing step, the determination unit F13 controls the painting system 40 based on the difference between the color obtained from the first synthetic image and the target color for the first synthetic image and the difference between the color obtained from the second synthetic image and the target color for the second synthetic image. That is to say, the determination unit F13 controls, based on the result of the color determination processing, the painting system 40 for painting the surface of the object 100. This renders the color of the surface of the object 100 closer to the target color. For example, FIG. 11 shows the relationship between a graph G10, G11 representing the color obtained from the synthetic image (namely, the first synthetic image or the second synthetic image) and a graph G20 representing the target color for the synthetic image. In FIG. 11, the curve G10 indicates the color before re-painting and G11 indicates the color after re-painting. This allows the inspection system 1 to modify the color of the surface of the object 100.

(Painting Processing)

The painting processing is processing for painting (hereinafter also referred to as "coating") the object 100. The painting processing will now be described with reference to the flowchart of FIG. 12 and FIGS. 13 and 14, each of which illustrates one scene of painting.

First of all, the determination unit F13 determines the region to paint (or the region to coat) on the surface of the object 100 (in S31). In this embodiment, the painting system 40 includes the two painting robots 41 and 42, and therefore, two regions to paint may be selected at a time from the surface of the object 100. Examples of the regions to paint include a hood, a roof, front doors, rear doors, a front bumper, a rear bumper, fenders, rear fenders, and a trunk lid. The determination unit F13 determines the region to paint using the image capturing system 30. The determination unit F13 makes the second camera 32 monitor the whole of the surface of the object 100 to find what regions on the surface of the object 100 are not painted yet (unpainted regions). The determination unit F13 selects the next region to paint from the unpainted regions on the surface of the object 100.

Next, the determination unit F13 carries out pre-painting check (in S32). In the pre-painting check, the determination unit F13 determines, before painting the region to paint, whether or not there is any foreign matter in the region to be paint. The determination unit F13 controls the image capturing system 30 to make one of the plurality of first cameras 31 (e.g., the first camera 312 in the example illustrated in FIG. 13) capture an image of the region to paint and acquires the captured image via the acquisition unit F11. The determination unit F13 detects, by image processing technology, any foreign matter from the region-to-paint image acquired by the acquisition unit F11. When determining whether or not there is any foreign matter, the determination unit F13 also determines the condition of the region to paint (including information about its hue and unevenness). The condition of the region to paint is reflected on the level of painting (coating level) by the painting system 40. For example, the amount of the paint dispensed (spray volume or spray concentration) is determined by the level of painting (coating level). In this case, if no foreign matter is detected (if the answer is NO in S33), then the determination unit F13 starts painting (or coating) the region to paint (in S34).

Figure 13:
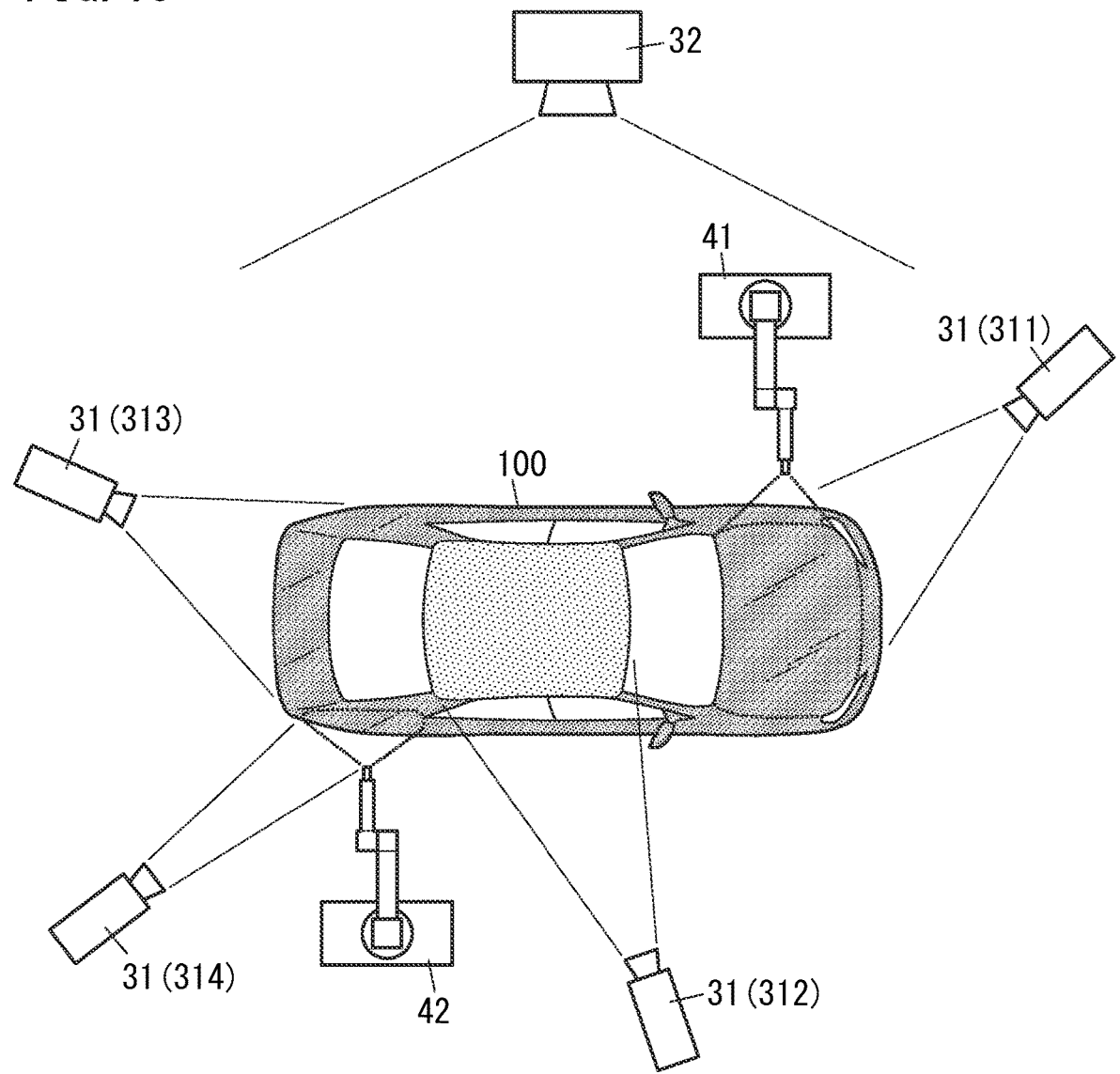
FIG. 13 illustrates how the inspection system performs a type of painting processing.

To paint the regions to paint, the determination unit F13 controls the painting system 40 to have the regions to paint (e.g., the hood and the right rear fender in the example illustrated in FIG. 13) painted by the painting robots 41 and 42 as shown in FIG. 13. In addition, the determination unit F13 also determines the condition of the regions being painted on the surface of the object 100. For this purpose, the determination unit F13 controls the image capturing system 30 to acquire an image of the regions to paint. In FIG. 13, the first cameras 311 and 314 are used to acquire an image of the regions to paint. The determination unit F13 obtains the difference between the painting condition of the surface (i.e., the current surface) derived from the image representing the surface of the object 100 as acquired by the acquisition unit F11 (i.e., an image representing the region to paint) and the target painting condition on the surface of the object 100. The determination unit F13 controls the painting system 40 so as to reduce the difference. For example, the determination unit F13 adjusts the spray concentration (the amount of the paint ejected) of the paint dispensed from the painting robots 41 and 42. In the painting determination processing, the determination unit F13 determines whether or not there is any lack of coating in the region to paint (in terms of the hue and uniformity, for example). Optionally, in this painting determination processing, the color of the surface of the object 100 may also be determined based on plurality of conditions of reflection having a specular reflection component and a diffuse reflection component at mutually different ratios on the surface of the object 100, as in the color determination processing described above.

When the painting is completed, the determination unit F13 carries out post-painting check (in S35). In the post-painting check, the determination unit F13 checks the condition after the painting. Examples of the conditions to be checked after painting include whether or not there is any paint curtaining, whether the paint is dry or not, and the degree of continuity with the painted region (in terms of hue and surface conditions). In this embodiment, the determination unit F13 determines whether or not there is any paint curtaining in the region being painted. For this purpose, the determination unit F13 controls the image capturing system 30 to capture an image of the region that has been painted using one of the plurality of first cameras 31 (e.g., the first camera 313 in FIG. 13) and acquire the image via the acquisition unit F11. Based on the region-to-paint image acquired by the acquisition unit F11, the determination unit F13 detects any paint curtaining. The paint curtaining may be detected based on the hue and surface condition (such as the color uniformity) of the region being painted, for example. The determination unit F13 obtains the difference between the painting condition of the surface (i.e., the current surface) derived from the image representing the surface of the object 100 as acquired by the acquisition unit F11 (i.e., an image representing the region being painted) and the target painting condition on the surface of the object 100. As the target painting condition on the surface of the object 100 (i.e., a comparative image on which decision is made whether or not there is any paint curtaining), a region painted uniformly with the paint may be used out of the image representing the whole of the surface of the object 100 and captured by the second camera 32. When finding the difference greater than a threshold value (i.e., a first threshold value), the determination unit F13 may determine that there should be some paint curtaining. Optionally, in determining whether or not there is any paint curtaining, the color of the surface of the object 100 may also be determined based on plurality of conditions of reflection having a specular reflection component and a diffuse reflection component at mutually different ratios on the surface of the object 100, as in the color determination processing described above.

In this case, if no paint curtaining is detected (if the answer is NO in S36), then the determination unit F13 determines, based on the image representing the whole of the surface of the object 100 and captured by the second camera 32, whether or not there is any unpainted region (in S371). If there is any unpainted region (if the answer is YES in S371), then the determination unit F13 determines where to paint next (in S31). On the other hand, if there are no unpainted regions (if the answer is NO in S371), then the determination unit F13 carries out a final check (in S372). In the final check, the determination unit F13 may perform the color determination processing to check the color of the whole of the surface of the object 100.

On the other hand, if any paint curtaining is detected (if the answer is YES in S36), then the determination unit F13 determines the degree of paint curtaining (in S381). More specifically, the determination unit F13 determines whether or not the degree of paint curtaining is significant. The degree of paint curtaining may or may not be significant depending on whether the paint curtaining may be repaired by re-painting. For example, when finding that the difference between the region-to-paint image acquired by the acquisition unit F11 and the comparative image has exceeded a second threshold value, which is greater than a first threshold value, the determination unit F13 may determine that the paint curtaining should be significant. Optionally, the first threshold value and the second threshold value may be equal to each other. Note that if any paint curtaining has been detected, then the determination unit F13 may generate paint curtaining recurrence prevention information by associating the feature quantity of the image representing the paint curtaining with the amount of paint dispensed, room temperature, humidity, ventilation flow rate, or any other parameter through statistical analysis or machine learning, for example.

Figure 14:
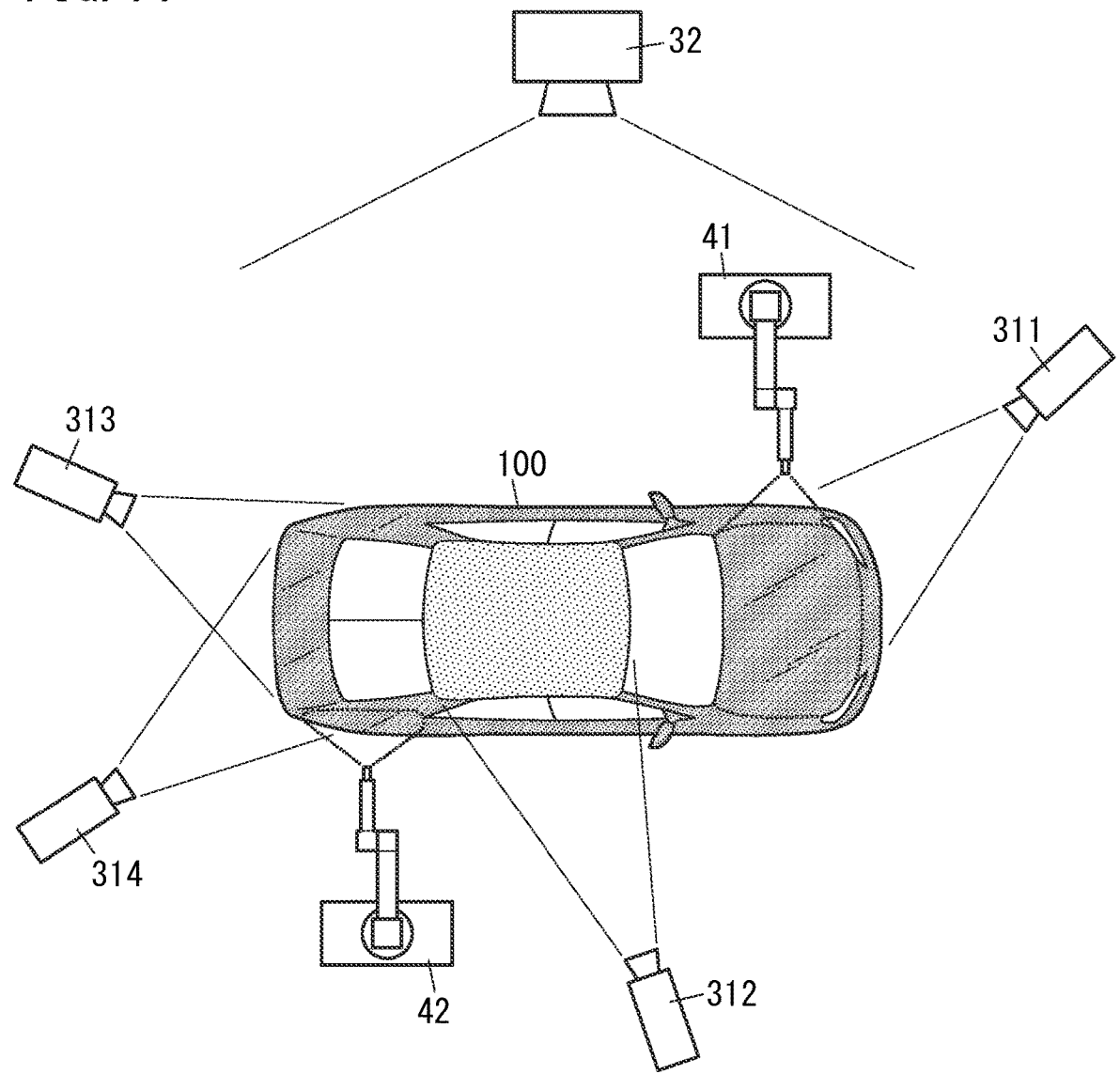
FIG. 14 illustrates how the inspection system performs another type of painting processing.

On the other hand, when finding the degree of paint curtaining insignificant (if the answer is NO in S381), the determination unit F13 performs re-coating (re-painting) (in S382). In the re-coating, the determination unit F13 also controls the painting system 40 to paint the region to paint, where the paint curtaining has been detected, all over again as in the coating processing step (in S34). For example, FIG. 14 illustrates how the first camera 314 captures an image of the trunk lid to have the trunk lid re-painted by the painting robot 42. When the re-painting is completed, the determination unit F13 carries out post-painting check again (in S35).

Note that if any foreign matter has been detected during the painting processing (if the answer is YES in S33) or if the degree of paint curtaining is significant (if the answer is YES in S381), then the determination unit F13 aborts the painting (coating) processing (in S39).

The painting processing includes painting determination processing (S34 and S35). The painting determination processing is processing for determining the surface painting condition of the object 100. More specifically, the painting determination processing is processing for determining the surface painting condition of the object 100 based on the image representing the surface of the object 100 as acquired by the acquisition unit F11. In the painting determination processing, the determination unit F13 obtains the difference between the surface painting condition derived from the image representing the surface of the object 100 as acquired by the acquisition unit F11 and the target surface painting condition for the object 100. The determination unit F13 controls, based on the result of the painting determination processing, the operating conditions of the plurality of cameras 31 and 32 of the image capturing system 30. That is to say, the determination unit F13 controls the operating conditions of the plurality of cameras 31 and 32 of the image capturing system 30 according to the progress of painting onto the object 100. In particular, the plurality of cameras 31 and 32 includes one or more first cameras 31 each generating an image representing a part of the surface of the object 100 and a second camera 32 generating an image representing the whole of the surface of the object 100. The determination unit F13 controls the operating conditions of the one or more first cameras 31 based on the result of the painting determination processing. In addition, the determination unit F13 also controls the operating conditions of the one or more first cameras 31 based on the image captured by the second camera 32 and the result of the painting determination processing.

In this embodiment, the determination unit F13 controls the plurality of cameras 31 and 32 of the image capturing system 30 to perform painting on the object 100 in its entirety. In this case, if the object 100 is a vehicle such as an automobile, then the object 100 has too large a size and has too many painting conditions to monitor (such as coating, paint curtaining, drying, and foreign matter deposition) to be shot in its entirety by a single camera. The inspection system 1 according to this embodiment, however, makes the first cameras (narrow-angle cameras) 31 for shooting only a local region of the object 100 being painted with paint interface with a second camera (bird's-eye view camera) 32 for capturing the painting condition on the entire object 100. This allows the inspection system 1 according to this embodiment to sense the painting condition of the object 100 without missing the condition of any part of the object 100.

(Texture Determination Processing)

The texture determination processing is processing for determining the surface texture of the object 100. The texture determination processing is processing for determining the surface texture of the object 100 based on a variation in luminance information between a plurality of series images acquired by capturing the images of the surface of the object 100 from multiple different positions L1-L3 (see FIG. 16). In this embodiment, the variation in luminance information is defined by feature quantity vectors (including a spatial feature quantity vector and a temporal feature quantity vector).

Figure 16:
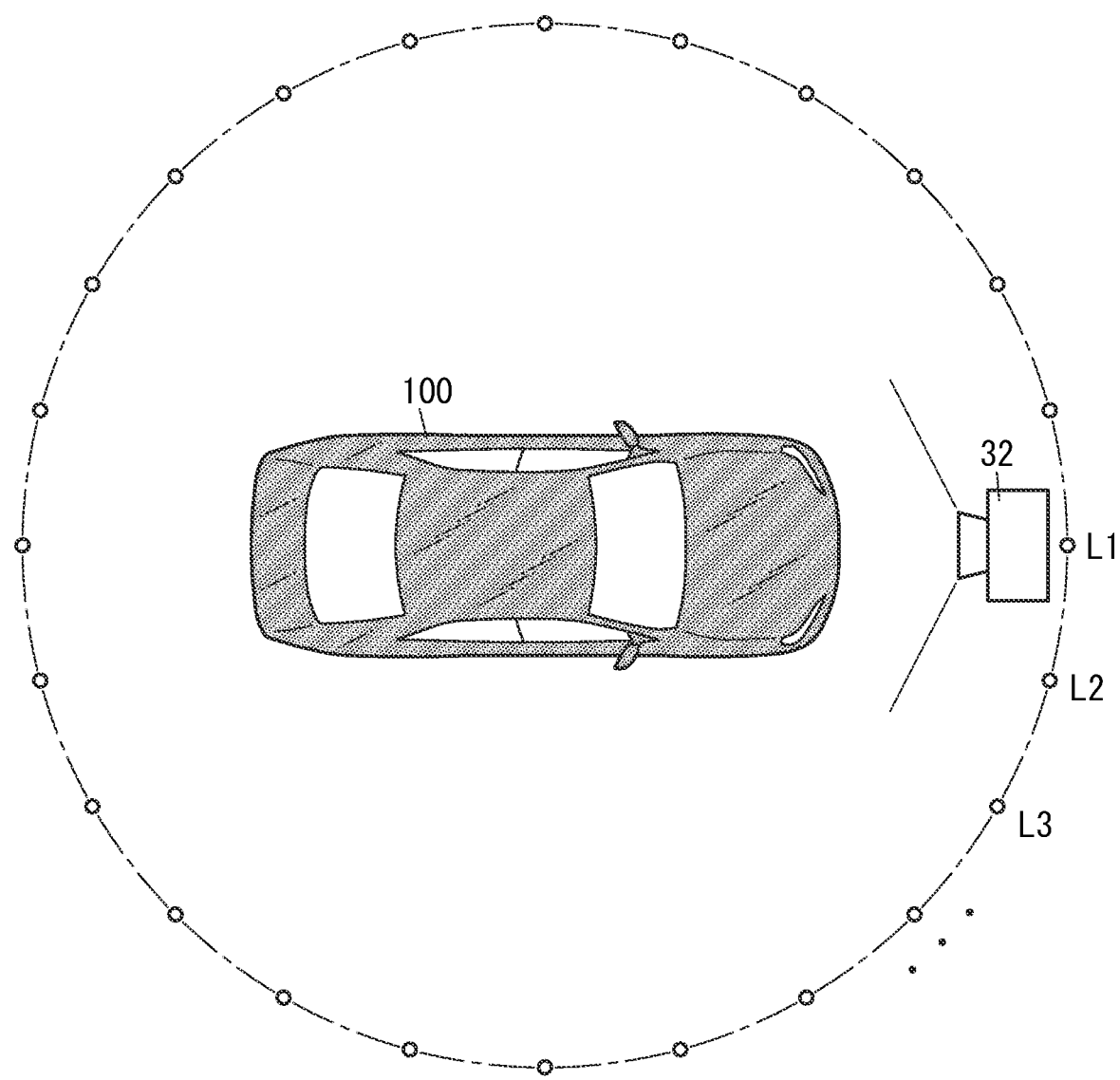
FIG. 16 illustrates how the inspection system performs texture determination processing.

Next, the texture determination processing will be described with reference to the flowchart of FIG. 15 and FIG. 16. FIG. 16 illustrates the relative position of the second camera 32 with respect to the object 100. Alternatively, the second camera 32 may be replaced with the first cameras 31.

First of all, the determination unit F13 makes the acquisition unit F11 acquire a plurality of series images which have been obtained by capturing images of the surface of the object 100 from multiple different positions L1-L3 (see FIG. 16) (in S41). At least two of the plurality of series images are obtained by capturing images of the surface of the object 100 with the position of the same camera 32 changed. More specifically, a plurality of series images are obtained by making the camera 32 capture images of the surface of the object 100 from multiple different positions L1, L2, L3, . . . as shown in FIG. 16. For example, these positions L1, L2, L3, . . . may be arranged so as to surround the object 100 and may be arranged on a circle centered around the object 100. Alternatively, the plurality of series images may also be captured by a plurality of cameras set up at those multiple different positions L1, L2, L3, . . . . In the following description, only two out of the plurality of series images (hereinafter referred to as a "first series image" and a "second series image") will be described. Note that the first series image is captured before the second series image.

Next, the determination unit F13 calculates the difference in luminance value between pixels (i.e., calculates a spatial feature quantity vector) (in S42). The determination unit F13 extracts luminance information from the series images. The luminance information is the difference between the luminance values (or pixel values) obtained from a plurality of pixels of the series images. The difference between the luminance values is the difference between the luminance value of a first region including one or more of the plurality of pixels of the series images and the luminance value of a second region adjacent to the first region and also including one or more of the plurality of pixels. For example, the first region may be a region consisting of m×n pixels, where m and n are each an integer equal to or greater than 1. In this embodiment, the first region consists of 1×1 pixel (i.e., a single pixel). The center pixel of the first region will be hereinafter referred to as a "first pixel (reference pixel)." In this case, the first region is the brightest region in the series image (i.e., an image consisting of a plurality of pixels). In this example, the first region consists of the first pixel, and therefore, the first pixel is a pixel with the highest luminance value among the plurality of luminance values of the series images. On the other hand, the second region may be a region surrounding the first region. For example, the second region may be a region consisting of M×N pixels centered around the first region, where m and n are each an integer equal to or greater than 3. In this embodiment, the second region consists of all of the plurality of pixels of the series image but the first pixel. That is to say, the determination unit F13 calculates the difference between the luminance value of the first pixel and the luminance value of each pixel for the series image and replaces the luminance value of each pixel with the differential value. In this manner, the determination unit F13 obtains a feature quantity vector (spatial feature quantity vector) consisting of the luminance value of the first pixel and the replaced luminance values (differential values) of the plurality of pixels of the series image. Note that the first pixel does not have to be a pixel with the largest luminance value but may also be a pixel with the smallest luminance value, a pixel of which the luminance value is an average of the image, or a pixel located at the center of the image.

Next, the determination unit F13 calculates the difference in luminance value between frames (as a temporal feature quantity vector) (in S43). Specifically, the determination unit F13 calculates the difference between the luminance value of a first region of interest including one or more of the plurality of pixels of a first series image and the luminance value of a second region of interest, corresponding to the first region of interest, among the plurality of pixels of a second series image. That is to say, the first region of interest and the second region of interest are selected so as to represent the same part of the surface of the object 100. For example, the first region of interest may be a region smaller than the first series image. The first region of interest may be a region consisting of m×n pixels, where m and n are each an integer equal to or greater than 1. The center pixel of the first region of interest may be a pixel with the largest luminance value, a pixel with the smallest luminance value, or a pixel of which the luminance value is an average of the image. In this embodiment, the center pixel of the first region of interest is a pixel, of which the luminance value is an average of the image. The second region of interest is a region of the same size as the first region of interest (i.e., a region consisting of m×n pixels). The center pixel of the second region of interest is a pixel that has the smallest difference in luminance value from, and suitably has the same luminance value as, the center pixel of the first region of interest. Then, the determination unit F13 calculates the difference between the respective luminance values of the first series image (first region of interest) and the second series image (second region of interest) and replaces the luminance value of the second series image (second region of interest) with the differential value. That is to say, the determination unit F13 calculates the difference between the luminance value of the pixel included in the first region of interest of the first series image and the luminance value of the pixel included in the second region of interest of the second series image. In this manner, the differential values between the luminance values are obtained for the m×n pixels. Thus, the determination unit F13 obtains a feature quantity vector (i.e., a temporal feature quantity vector) including, as its elements, the luminance value of the center pixel of the first region of interest and the replaced pixel values (differential values) of the second series image.

Finally, the determination unit F13 calculates the texture (texture level) (in S44). In this embodiment, the texture is given as a combination of the spatial feature quantity vector and the temporal feature quantity vector. In other words, according to this embodiment, the surface texture of the object 100 is represented as a numerical value in the form of a combination of the spatial feature quantity vector and the temporal feature quantity vector. Then, the determination unit F13 may determine, based on the numerical values, whether or not the texture satisfies the required one. For example, the determination unit F13 may determine, by seeing if the magnitude of the vector indicating the texture is greater than a threshold value, whether or not the texture satisfies the required one. When finding the texture satisfying the required one, the determination unit F13 may determine that the result of the texture test should be a GO. On the other hand, when finding the texture not satisfying the required one, the determination unit F13 may determine that the object 100 should be either re-painted or the result of the texture test should be a NO-GO.

As can be seen, according to this embodiment, variations caused by relative displacement between the camera 32 and the object 100 in luminance value are calculated along the spatial axis and the time axis and are integrated together. The variation in luminance value along the spatial axis (i.e., spatial variation) is given as the difference between the luminance value of the reference pixel and the luminance value of a neighboring pixel. Examples of the reference pixels include the brightest pixel, the darkest pixel, a pixel with average brightness, and a pixel at the center of the image. The variation in luminance value along the time axis (temporal variation) is given as the difference between a reference frame and a neighboring frame. Thus, according to this embodiment, the texture (i.e., a human touch sensation about the surface condition) of the surface (in particular, a painted surface) of the object 100 is able to be measured and represented as a numerical value.

1.3 Resume

The inspection system 1 described above includes an acquisition unit F11 and a determination unit F13. The acquisition unit F11 acquires an image representing the surface of an object 100. The determination unit F13 performs color determination processing. The color determination processing is performed to determine a color of the surface of the object 100 based on a plurality of conditions of reflection. The plurality of conditions of reflection are obtained from the image representing the surface of the object 100 as acquired by the acquisition unit F11, and have a specular reflection component and a diffuse reflection component at respectively different ratios on the surface of the object 100. This allows the inspection system 1 to improve the accuracy of surface color determination of the object 100.

In other words, it can be said that the inspection system 1 carries out the following method (inspection method). The inspection method includes an acquisition step and a determination step. The acquisition step includes acquiring an image representing the surface of an object 100. The determination step includes performing color determination processing. The color determination processing is performed to determine a color of the surface of the object 100 based on a plurality of conditions of reflection. The plurality of conditions of reflection are obtained from the image representing the surface of the object 100, and have a specular reflection component and a diffuse reflection component at respectively different ratios on the surface of the object 100. Thus, this inspection method, as well as the inspection system 1, improves the accuracy of surface color determination of the object 100.

The inspection method is carried out by making one or more processors execute a program (computer program). This program is designed to make the one or more processors carry out the inspection method. Such a program, as well as the inspection method, improves the accuracy of surface color determination of the object 100. Also, the program may be distributed by being stored on a storage medium. The storage medium is a computer readable, non-transitory storage medium, and stores the program thereon. Such a storage medium, as well as the inspection method, improves the accuracy of surface color determination of the object 100.

From another perspective, the inspection system 1 includes an image capturing system 30, an acquisition unit F11, and a determination unit F13. The image capturing system 30 generates an image representing the surface of the object 100 by capturing an image of the surface of the object 100. The acquisition unit F11 acquires the image representing the surface of the object 100 from the image capturing system 30. The determination unit F13 performs, based on the image representing the surface of the object 100 as acquired by the acquisition unit F11, painting determination processing for determining a painting condition on the surface of the object 100, and thereby controls the image capturing system 30 based on a result of the painting determination processing. This inspection system 1 improves the quality of surface painting of the object 100.

From still another perspective, the inspection system 1 includes an acquisition unit F11 and a determination unit F13. The acquisition unit F11 acquires a plurality of series images that have been obtained by capturing images of the surface of the object 100 from multiple different positions L1-L3. The determination unit F13 performs texture determination processing for determining a surface texture of the object 100 based on a variation in luminance information between the plurality of series images. This aspect further improves the accuracy of surface texture determination of the object 100.

2. Variations

Note that embodiments described above are only examples of the present disclosure and should not be construed as limiting. Rather, those embodiments may be readily modified in various manners depending on a design choice or any other factor without departing from a true spirit and scope of the present invention. Variations of the embodiments will be enumerated one after another.

Figure 17:
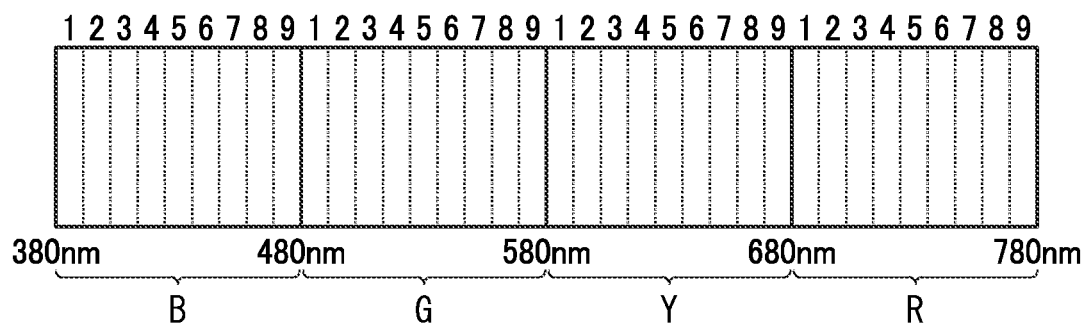
FIG. 17 illustrates an image capturing system.

In the exemplary embodiment described above, the cameras of the image capturing system 30 are able to detect light, of which the wavelength falls within a predetermined wavelength range, for example. The predetermined wavelength range may be from 380 nm to 780 nm, for example. However, this is only an example and should not be construed as limiting. Alternatively, the plurality of cameras of the image capturing system 30 may have filters with mutually different transmission bands. For example, the four first cameras 311-314 may be configured to detect light rays with wavelengths falling within mutually different wavelength ranges. Such light rays with wavelengths falling within mutually different wavelength ranges may include a light ray with a wavelength falling within the range from 380 nm to 480 nm (i.e., a blue ray), a light ray with a wavelength falling within the range from 480 nm to 580 nm (i.e., a green ray), a light ray with a wavelength falling within the range from 580 nm to 680 nm (i.e., a yellow ray), and a light ray with a wavelength falling within the range from 680 nm to 780 nm (i.e., a red ray) as shown in FIG. 17. Detecting light rays with wavelengths falling within mutually different wavelength ranges using the plurality of cameras 31 in this manner allows the color of the object 100 to be determined more precisely. Particularly in the example illustrated in FIG. 17, each of the four wavelength ranges is subdivided into nine bands at a step width of 10 nm, and therefore, the wavelength range from 380 nm to 780 nm is detected by being divided into 36 bands. This allows the color of the object 100 to be determined more precisely than a three-band configuration, which is used relatively frequently. Optionally, the same advantage may be achieved by having a single camera use multiple filters with mutually different transmission bands.

In one variation, the wavelength of the light radiated from the lighting system 20 may be variable. This is achievable by using either multiple light sources that emit light beams in multiple different colors or multiple color filters. In short, in this inspection system 1, at least one of the wavelength of the light radiated from the lighting system 20 or the wavelength of the light detected by the image capturing system 30 may be variable.

In the exemplary embodiment described above, the plurality of partial images P31-P34 are generated by a plurality of cameras 31 having mutually different image capturing directions with respect to the object 100. However, this is only an example and should not be construed as limiting. Alternatively, the plurality of partial images P31-P34 may also be obtained by capturing images of the surface of the object 100 with the position of the same camera changed.

Also, in the exemplary embodiment described above, the plurality of conditions of reflection having the specular reflection component and the diffuse reflection component at mutually different ratios on the surface of the object 100 are in the form of images. However, this is only an example and should not be construed as limiting. Alternatively, the conditions of reflection may also be in the form of histograms or any other form. That is to say, the conditions of reflection from the surface of the object 100 do not have to be given in the form of images but may also be given in a form that enables color determination according to the conditions of reflection.

In one variation, the setting processing does not have to be performed. Unless the setting processing is performed, the color determination processing may be performed with sample data provided for each of the images generated by the plurality of cameras 31. This allows the plurality of cameras 31 to perform the color determination processing on an individual basis on multiple different surface regions of the object 100. Note that in that case, the images are not synthesized together at the time of the color determination processing.

Furthermore, in the exemplary embodiment described above, the determination unit F13 controls, during the re-painting, the painting system 40 based on the difference between the color obtained from the first synthetic image and the target color for the first synthetic image and the difference between the color obtained from the second synthetic image and the target color for the second synthetic image. However, this is only an example and should not be construed as limiting. Alternatively, the determination unit F13 may control the painting system 40 using learned models (color control models). As used herein, the "color control models" refer to learned models in which the relationship between a combination of a color yet to be modified and a modified color and the specifics of control for the painting system 40 has been learned. In that case, the storage unit 12 stores the color control models. The color control models are generated by making an artificial intelligence program (algorithm) learn the relationship between a combination of a color yet to be modified and a modified color and the specifics of control for the painting system 40, using a learning data set representing the relationship between the combination of the color yet to be modified and the modified color and the specifics of control for the painting system 40. The artificial intelligence program is a machine learning model and may be a neural network, which is a type of hierarchical model, for example. The color control model may be generated by making the neural network perform machine learning (such as deep learning) using the learning data set. That is to say, the color control model may be generated by either the processing unit 13 of the inspection system 1 or an external system. In the inspection system 1, the processing unit 13 may collect and accumulate learning data for generating the color control models. As can be seen, the learning data newly collected by the processing unit 13 may be used for relearning the color control models, thus contributing to performance improvement of the color control models (learned models). In particular, the performance of the color control models may be improved through relearning in a situation where the result of the color determination processing turns out to be a NO-GO again after the re-painting.

In one variation, the determination unit F13 may use models for the texture determination processing. Those models may be obtained by making a plurality of painting samples, making multiple pairs of GO/NO-GO decisions of painting and the texture levels, and then modelling their relationship. Modelling may be carried out through either regression analysis or machine learning, for example. This allows the determination unit F13 to make the GO/NO-GO decisions of painting based on the texture levels. In another variation, only spatial feature quantity vectors may be used to measure the texture levels when the positional relation between the camera 32 and the object 100 is fixed.

In another variation, in the texture determination processing, the luminance information may be the difference between the luminance values obtained from a plurality of pixels of the series image. This difference may be the difference between the luminance value of a first region including one or more of the plurality of pixels and the luminance value of a second region adjacent to the first region and also including one or more of the plurality of pixels. Alternatively, the first region may also be a first pixel out of the plurality of pixels and the second region may also be a second pixel adjacent to the first pixel out of the plurality of pixels. Still alternatively, the first region may be the brightest region in an image made up of the plurality of pixels.

In still another variation, the inspection system 1 (determination system 10) may also be implemented as a plurality of computers. For example, the respective functions (among other things, the acquisition unit F11, the separation unit F12, and the determination unit F13) of the inspection system 1 (determination system 10) may be distributed in multiple devices. Optionally, at least some functions of the inspection system (1) (determination system (10)) may be implemented as cloud computing as well.

The agent that performs the functions of the inspection system (1) (determination system (10)) described above includes a computer system. In that case, the computer system may include, as principal hardware components, a processor and a memory. The functions of the agent serving as the inspection system (1) (determination system (10)) according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Optionally, a field-programmable gate array (FPGA) to be programmed after an LSI has been fabricated or a reconfigurable logic device allowing the connections or circuit sections inside of an LSI to be reconfigured or set up may also be used for the same purpose. Those electronic circuits may be either integrated together on a single chip or distributed on multiple chips, whichever is appropriate. Those multiple chips may be integrated together in a single device or distributed in multiple devices without limitation.

3. Aspects

As can be seen from the foregoing description of exemplary embodiments and variations, the present disclosure has the following aspects. In the following description, reference signs are added in parentheses to the respective constituent elements, solely for the purpose of clarifying the correspondence between those aspects of the present disclosure and the exemplary embodiments or variations described above.

A first aspect is an inspection system (1) including an acquisition unit (F11) and a determination unit (F13). The acquisition unit (F11) acquires an image (P30-P34) representing a surface of an object (100). The determination unit (F13) performs color determination processing. The color determination processing is performed to determine a color of the surface of the object (100) based on a plurality of conditions of reflection. The plurality of conditions of reflection are obtained from the image (P30-P34) representing the surface of the object (100) as acquired by the acquisition unit (F11), and have a specular reflection component and a diffuse reflection component at respectively different ratios on the surface of the object (100). This aspect improves the accuracy of surface color determination of the object (100).

A second aspect is based on the inspection system (1) according to the first aspect. In the second aspect, the inspection system (1) further includes a separation unit (F12). The separation unit (F12) obtains, based on the image acquired by the acquisition unit (F11), a plurality of separate images (P10, P20), each of which is an image (P30-P34) representing the surface of the object (100) but which have the specular reflection component and the diffuse reflection component at respectively different ratios. The determination unit (F13) determines, through the color determination processing, the color of the surface of the object (100) based on the plurality of separate images (P10, P20). This aspect improves not only the accuracy of surface color determination of the object (100) but also the efficiency of the color determination processing as well.

A third aspect is based on the inspection system (1) according to the first or second aspect. In the third aspect, the acquisition unit (F11) acquires, as images representing the surface of the object (100), a plurality of partial images (P31-P34) each representing an associated part of the surface of the object (100). The determination unit (F13) determines, through the color determination processing, the color of the surface of the object (100) based on an image (P10, P20) representing, in each of the plurality of conditions of reflection, a whole of the surface of the object (100). The image (P10, P20) is obtained based on the plurality of partial images. This aspect allows the color of the surface of a relatively large object (100) to be determined.

A fourth aspect is based on the inspection system (1) according to the third aspect. In the fourth aspect, the plurality of partial images (P31-P34) are generated by a plurality of cameras (31) having mutually different image capturing directions with respect to the object (100). This aspect allows the color of the surface of a relatively large object (100) to be determined using a simple configuration.

A fifth aspect is based on the inspection system (1) according to any one of the first to fourth aspects. In the fifth aspect, the inspection system (1) further includes a lighting system (20) and an image capturing system (30). The lighting system (20) irradiates the surface of the object (100) with light. The image capturing system (30) generates an image representing the surface of the object (100) by capturing an image of the surface of the object (100) being irradiated by the lighting system (20). The acquisition unit (F11) acquires, from the image capturing system (30), the image representing the surface of the object (100). At least one of a wavelength of the light radiated by the lighting system (20) or a wavelength of light detected by the image capturing system (30) is changeable. This aspect improves the accuracy of surface color determination of the object (100).

A sixth aspect is based on the inspection system (1) according to any one of the first to fifth aspects. In the sixth aspect, the determination unit (F13) determines, through the color determination processing, the color of the surface of the object (100) using sample data including information about a target color of the surface of the object (100). This aspect further improves the accuracy of surface color determination of the object (100).

A seventh aspect is based on the inspection system (1) according to the sixth aspect. In the seventh aspect, the sample data includes at least one of information about a shape of the object (100) or information about a condition for capturing an image of the object (100). This aspect further improves the accuracy of surface color determination of the object (100).

An eighth aspect is based on the inspection system (1) according to any one of the first to seventh aspects. In the eighth aspect, the determination unit (F13) controls, based on a result of the color determination processing, a painting system (40) to paint the surface of the object (100). This aspect improves the quality of surface painting of the object (100).

A ninth aspect is based on the inspection system (1) according to the first aspect. In the ninth aspect, the inspection system (1) further includes an image capturing system (30) to generate an image representing the surface of the object (100) by capturing an image of the surface of the object (100). The acquisition unit (F11) acquires the image representing the surface of the object (100) from the image capturing system (30). The determination unit (F13) performs, based on the image representing the surface of the object (100) as acquired by the acquisition unit (F11), painting determination processing for determining a painting condition on the surface of the object (100), and thereby controls the image capturing system (30) based on a result of the painting determination processing. This aspect improves the quality of surface painting of the object (100).

A tenth aspect is based on the inspection system (1) according to the ninth aspect. In the tenth aspect, the determination unit (F13) calculates, through the painting determination processing, a difference between a current painting condition on the surface of the object and a target painting condition on the surface of the object (100). The current painting condition is obtained from an image representing the surface of the object (100) as acquired by the acquisition unit (F11). This aspect improves the quality of surface painting of the object (100).

An eleventh aspect is based on the inspection system (1) according to the ninth or tenth aspect. In the eleventh aspect, the image capturing system (30) includes a plurality of cameras (31, 32). The determination unit (F13) controls, based on a result of the painting determination processing, operating conditions of the plurality of cameras (31, 32) of the image capturing system (30). This aspect improves the quality of surface painting of the object (100).

A twelfth aspect is based on the inspection system (1) according to the eleventh aspect. In the twelfth aspect, the plurality of cameras (31, 32) includes: one or more first cameras (31) to generate an image representing a part of the surface of the object (100); and a second camera (32) to generate an image representing the whole of the surface of the object (100). The determination unit (F13) controls, based on a result of the painting determination processing, an operating condition of the one or more first cameras (31). This aspect improves the quality of surface painting of the object (100).

A thirteenth aspect is based on the inspection system (1) according to the twelfth aspect. In the thirteenth aspect, the determination unit (F13) controls, based on the image generated by the second camera (32) and the result of the painting determination processing, the operating condition of the one or more first cameras (31). This aspect improves the quality of surface painting of the object (100).

A fourteenth aspect is based on the inspection system (1) according to the first aspect. In the fourteenth aspect, the acquisition unit (F11) acquires a plurality of series images by capturing images of the surface of the object (100) from multiple different positions (L1-L3). The determination unit (F13) performs texture determination processing for determining a surface texture of the object (100) based on a variation in luminance information between the plurality of series images. This aspect further improves the accuracy of surface texture determination of the object (100).

A fifteenth aspect is based on the inspection system (1) according to the fourteenth aspect. In the fifteenth aspect, at least two of the plurality of series images are obtained by capturing images of the surface of the object (100) with a position of the same camera changed. This aspect further improves the accuracy of surface texture determination of the object (100).

A sixteenth aspect is based on the inspection system (1) according to the fourteenth or fifteenth aspect. In the sixteenth aspect, each of the plurality of series images includes a plurality of pixels. The luminance information includes a difference between luminance values obtained from the plurality of pixels. This aspect further improves the accuracy of surface texture determination of the object (100).

A seventeenth aspect is based on the inspection system (1) according to the sixteenth aspect. In the seventeenth aspect, the difference is calculated between a luminance value of a first region including one or more of the plurality of pixels and a luminance value of a second region adjacent to the first region and including another one or more of the plurality of pixels. This aspect further improves the accuracy of surface texture determination of the object (100).

An eighteenth aspect is based on the inspection system (1) according to the seventeenth aspect. In the eighteenth aspect, the first region is constituted by a first pixel out of the plurality of pixels, and the second region is constituted by a second pixel adjacent to the first pixel out of the plurality of pixels. This aspect further improves the accuracy of surface texture determination of the object (100).

A nineteenth aspect is based on the inspection system (1) according to the seventeenth or eighteenth aspect. In the nineteenth aspect, the first region is the brightest region in the image constituted of the plurality of pixels. This aspect further improves the accuracy of surface texture determination of the object (100).

A twentieth aspect is an inspection method including an acquisition step and a determination step. The acquisition step includes acquiring an image (P30-P34) representing a surface of an object (100). The determination step includes performing color determination processing. The color determination processing is performed to determine a color of the surface of the object (100) based on a plurality of conditions of reflection. The plurality of conditions of reflection are obtained from the image (P30-P34) representing the surface of the object (100) and have a specular reflection component and a diffuse reflection component at respectively different ratios on the surface of the object (100). This aspect improves the accuracy of surface color determination of the object (100). Note that the second through nineteenth aspects relating to the inspection system (1) are applicable in the form of an inspection method to this twentieth aspect.

A twenty-first aspect is a program designed to cause one or more processors to execute the inspection method of the twentieth aspect. This aspect improves the accuracy of surface color determination of the object (100).

A twenty-second aspect is a computer-readable non-transitory storage medium storing the program of the twenty first aspect thereon. This aspect improves the accuracy of surface color determination of the object (100).

The present disclosure further has the following twenty-third to thirty-fourth aspects.

A twenty-third aspect is a coloring inspection device. The coloring inspection device includes a camera, of which a filter transmitting light falling within a particular wavelength range is replaceable, and makes color inspection on an object of shooting using an image captured by the camera.

A twenty-fourth aspect is based on the coloring inspection device according to the twenty-third aspect. In the twenty-fourth aspect, the coloring inspection device includes a plurality of the cameras, makes a synthetic image by synthesizing together images captured by the plurality of the cameras, and calculates and outputs an image capturing condition based on the synthetic image.

A twenty-fifth aspect is based on the coloring inspection device according to the twenty-fourth aspect. In the twenty-fifth aspect, the filters provided for the plurality of the cameras have mutually different transmission bands.

A twenty-sixth aspect is based on the coloring inspection device according to the twenty-fourth or twenty-fifth aspect.

In the twenty-sixth aspect, the plurality of the cameras shoot the object of shooting from multiple different directions.

A twenty-seventh aspect is based on the coloring inspection device according to any one of the twenty-fourth to twenty-sixth aspects. In the twenty-seventh aspect, the coloring inspection device controls, based on the synthetic image, the angle of view and zooming of the cameras so as to maintain continuity of gradation of the object of shooting.

A twenty-eighth aspect is based on the coloring inspection device according to the twenty-seventh aspect. In the twenty-eighth aspect, the coloring inspection device controls the cameras based on information about the shape of the object of shooting and lighting information.

A twenty-ninth aspect is based on the coloring inspection device according to any one of the twenty-third to twenty-eighth aspects. In the twenty-ninth aspect, the coloring inspection device records color data as samples, compares the color of the object of shooting with the color data as samples, and thereby controls a painting unit for painting the object of shooting.

A thirtieth aspect is a coloring inspection method. The coloring inspection method includes: shooting an object of shooting from multiple different directions using a plurality of cameras provided with filters with mutually different transmission bands; making a synthetic image by synthesizing together images captured by the plurality of cameras; and performing color inspection on the object of shooting based on the synthetic image.

A thirty-first aspect is based on the coloring inspection method according to the thirtieth aspect. In the thirty-first aspect, the color inspection method includes outputting an image capturing condition based on the synthetic image.

A thirty-second aspect is based on the coloring inspection method according to the thirtieth or thirty-first aspect. In the thirty-second aspect, the color inspection method includes controlling, based on the synthetic image, the angle of view and zooming of the cameras so as to maintain continuity of gradation of the object of shooting.

A thirty-third aspect is based on the coloring inspection method according to the thirty-first aspect. In the thirty-third aspect, the coloring inspection method controls the cameras based on information about the shape of the object of shooting and lighting information.

A thirty-fourth aspect is based on the coloring inspection method according to any one of the thirtieth to thirty-third aspects. In the thirty-fourth aspect, the coloring inspection method records color data as samples, compares the color of the object of shooting with the color data as samples, and thereby controls a painting unit for painting the object of shooting.

The present disclosure further has the following thirty-fifth to thirty-seventh aspects.

A thirty-fifth aspect is a system. The system includes: a painting information acquisition unit (which means a group of cameras) for acquiring information about a painting condition at a certain point in time; a standard information retaining unit for retaining standard information indicating what the painting condition should be at that point in time; and a control unit connected to the painting information acquisition unit and the standard information retaining unit. The control unit calculates the difference between information provided by the painting information acquisition unit and information provided by the standard information retaining unit and transmits, based on the difference, a control command to the painting information acquisition unit (which means a group of cameras).

A thirty-sixth aspect is based on the system according to the thirty-fifth aspect. In the thirty-sixth aspect, the control command is given to change operating conditions (such as panning and zooming) of the cameras included in the painting information acquisition unit (which means a group of cameras).

A thirty-seventh aspect is based on the system according to the thirty-sixth aspect. In the thirty-seventh aspect, the painting information acquisition unit (which means a group of cameras) includes a bird's-eye view camera and a narrow-angle camera. The control command is given to change operating conditions (such as panning and zooming) of the narrow-angle camera.

The present disclosure further has the following thirty-eighth to forty-first aspects.

A thirty-eighth aspect is an image capturing method. The image capturing method includes the steps of: displacing an image capture device relative to an object; and obtaining a variation in luminance value information included in information collected by capturing images of the object before and after the image capture device is displaced.

A thirty-ninth aspect is based on the image capturing method according to the thirty-eighth aspect. In the thirty-ninth aspect, the information acquired by the image capture device before the image capture device is displaced is defined to be image information. The image information includes a plurality of pixels. The image capturing method includes obtaining a variation in difference between luminance values of the plurality of pixels before and after the image capture device is displaced.

A fortieth aspect is based on the image capturing method according to the thirty-ninth aspect. In the fortieth aspect, the difference is a difference between a luminance value at a first pixel of the image information and a luminance value at a second pixel adjacent to the first pixel.

A forty-first aspect is based on the image capturing method according to the fortieth aspect. In the forty-first aspect, the first pixel is a pixel that has the highest luminance value in the entire image information.

REFERENCE SIGNS LIST

1 Inspection System
F11 Acquisition Unit
F12 Separation Unit
F13 Determination Unit
20 Lighting System
30 Image Capturing System
31 Camera (First Camera)
32 Camera (Second Camera)
40 Painting System
P10 First Separate Image (Separate Image)
P20 Second Separate Image (Separate Image)
P30 Image
P30-P34 Image (Partial Image)
L1-L3 Position
100 Object

The invention claimed is:
1. An inspection system comprising:
an acquisitor configured to acquire a plurality of images representing a surface of an object;
a separator configured to respectively obtain a plurality of first separate images from the plurality of images acquired by the acquisitor, the plurality of first separate images representing a condition of reflection in which a proportion of a specular reflection component on the surface of the object is greater than a proportion of a diffuse reflection component on the surface of the object; and a determiner configured to synthesize together the plurality of first separate images respectively obtained from the plurality of images to generate a first synthetic image, wherein the determiner is configured to determine a condition of the object based on the first synthetic image.

2. The inspection system of claim 1, wherein
the separator is configured to respectively obtain the plurality of first separate images and a plurality of second separate images from the plurality of images acquired by the acquisitor.

3. The inspection system of claim 2, wherein
the plurality of second separate images represents a condition of reflection in which the proportion of the diffuse reflection component on the surface of the object is greater than the proportion of the specular reflection component on the surface of the object.

4. The inspection system of claim 2, wherein
the determiner is configured to synthesize together the plurality of second separate images respectively obtained from the plurality of images to generate a second synthetic image,
the determiner is configured to determine the condition of the object based on the second synthetic image.

5. The inspection system of claim 2, further comprising:
a lighting system configured to irradiate the surface of the object with light, wherein
the lighting system includes a lamp for irradiating the surface of the object with light, and
the lamp radiates white light.

6. The inspection system of claim 3, wherein
the determiner is configured to determine a color of the surface of the object using sample data including information about a target color of the surface of the object.

7. The inspection system of claim 3, wherein the determiner is configured to determine the condition of the object using sample data including information about a shape of the surface of the object.

8. An inspection method comprising the steps of:
acquiring a plurality of images representing a surface of an object;
respectively obtaining a plurality of separate images from the plurality of images acquired in the step of acquiring the plurality of images, the plurality of separate images representing a condition of reflection in which a proportion of a specular reflection component on the surface of the object is greater than a proportion of a diffuse reflection component on the surface of the object; and
synthesizing together the plurality of separate images respectively obtained from the plurality of images to generate a synthetic image, wherein
the step of synthesizing together the plurality of separate images includes determining a condition of the object based on the synthetic image.

\* \* \* \* \*